(12) United States Patent
Chang et al.

(10) Patent No.: US 12,113,859 B2
(45) Date of Patent: *Oct. 8, 2024

(54) ZERO-TRUST AUTHENTICATION FOR SECURE REMOTE DIRECT MEMORY ACCESS

(71) Applicant: NOKIA SOLUTIONS AND NETWORKS OY, Espoo (FI)

(72) Inventors: Hyunseok Chang, Holmdel, NJ (US); Sarit Mukherjee, Morganville, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,950

(22) Filed: Oct. 31, 2023

(65) Prior Publication Data
US 2024/0064203 A1 Feb. 22, 2024

Related U.S. Application Data

(63) Continuation of application No. 17/691,544, filed on Mar. 10, 2022, now Pat. No. 11,818,213.

(51) Int. Cl.
   *G06F 15/16* (2006.01)
   *H04L 9/40* (2022.01)
   *H04L 67/1097* (2022.01)

(52) U.S. Cl.
   CPC ...... *H04L 67/1097* (2013.01); *H04L 63/0435* (2013.01); *H04L 63/20* (2013.01)

(58) Field of Classification Search
   CPC .. H04L 67/1097; H04L 63/0435; H04L 63/20
   (Continued)

(56) References Cited

U.S. PATENT DOCUMENTS 10,505,851 B1 * 12/2019 Matthews ........... H04L 47/6255
10,931,602 B1 *  2/2021 Matthews ............. H04L 49/35
(Continued)

OTHER PUBLICATIONS

Alibaba Cloud Community, "Alibaba Builds High-Speed RDMA Network for AI and Scientific Computing," accessed from, https://www.alibabacloud.com/blog/alibaba-builds-high-speed-rdmanetwork-for-ai-and-scientific-computing_594895, Jun. 3, 2019, 5 pages.
(Continued)

*Primary Examiner* — Liang Che A Wang
(74) *Attorney, Agent, or Firm* — Tong, Rea, Bentley & Kim, LLC

(57) ABSTRACT

Various example embodiments for supporting zero-trust policy enforcement in a communication system are presented herein. Various example embodiments for supporting zero-trust policy enforcement in a communication system may be configured to support zero-trust policy enforcement, including zero-trust authentication, for Remote Direct Memory Access (RDMA) communications. Various example embodiments for supporting zero-trust policy enforcement for RDMA communications may be configured to support transparent zero-trust policy enforcement for RDMA communications by leveraging programmable Smart Network Interface Cards (SmartNICs). Various example embodiments for supporting zero-trust policy enforcement for RDMA communications based on leveraging of programmable SmartNICs may be configured to support zero-trust policy enforcement for RDMA communications by applying zero-trust policies on a connection-by-connection basis within SmartNICs for RDMA connections between RDMA applications hosted on end hosts served by the SmartNICs.

20 Claims, 10 Drawing Sheets

(58) Field of Classification Search
USPC .......................... 709/212, 217, 218, 227, 228
See application file for complete search history.

(56) References Cited

U.S. PATENT DOCUMENTS

| | | | | |
|---|---|---|---|---|
| 2010/0097934 | A1* | 4/2010 | Hendel | H04L 45/04 370/392 |
| 2013/0159449 | A1* | 6/2013 | Taylor | G06F 9/54 709/212 |
| 2016/0188527 | A1* | 6/2016 | Cherian | H04L 41/12 709/212 |
| 2019/0205244 | A1* | 7/2019 | Smith | G06F 3/065 |
| 2020/0242258 | A1* | 7/2020 | Smith | H04L 9/3268 |
| 2022/0210084 | A1* | 6/2022 | Bowers | H04L 47/28 |

OTHER PUBLICATIONS

Newill, T., "Large Clusters, Lowest Latency: Cluster Networking on Oracle Cloud Infrastructure," Oracle Cloud Infrastructure Blog, Jun. 17, 2019, 4 pages.

Gao, Y., et al., "When Cloud Storage Meets RDMA," Proceedings of the 18th USENIX Symposium on Networked Systems Design and Implementation, Apr. 12, 2021, 16 pages.

Karmarkar, T., "Availability of Linux RDMA on Microsoft Azure," accessed from https://azure.microsoft.com/en-us/blog/azure-linux-rdma-hpc-available/, Jul. 9, 2015, 7 pages.

Guo, C., et al., "RDMA over Commodity Ethernet at Scale," Proceedings of the 2016 ACM SIGCOMM Conference, Aug. 22, 2016, 14 pages.

Rose, S., et al., "Zero Trust Architecture," NIST Special Publication 800-207, accessed from https://nvlpubs.nist.gov/nistpubs/SpecialPublication/NIST.SP.800-207.pdf, 59 pages.

Microsoft, "SMB Direct," accessed from https://docs.microsoft.com/en-us/previous-versions/windows/it-pro/windowsserver-2012-r2-and-2012/jj134210(v=ws.11), Jan. 25, 2022, 6 pages.

Tian, F., et al., "Accelerating Distributed Deep Learning using Multi-Path RDMA in Data Center Networks," ACM SIGCOMMS Symposium on SDN Research 2021 (SOSR "21), Oct. 11, 2021, 13 pages.

Cai, Q., et al., "Efficient Distributed Memory Management with RDMA and Caching," Proceedings of the VLDB Endowment, vol. 11, No. 11, Aug. 2018, 14 pages.

Rotherberger, B., et al., "ReDMArk: Bypassing RDMA Security Mechanisms," Proceedings of the 30th USENIX Security Symposium, Aug. 11, 2021, 17 pages.

Jurgens, D., "SELinux support for Infiniband RDMA", LWN.net, Apr. 19, 2016, 3 pages.

Mellanox Technologies, "Security in Mellanox Technologies InfinBand Fabrics," Technical Report, accessed from https://network.nvidia.com/related-docs/, 2012, 7 pages.

NVIDIA, "NVIDIA Mellanox ConnectX-6 Dx—HPE Ethernet SmartNIC," accessed from https://www.nvidia.com/content/dam/en-zz/Solutions/Data-Center/documents/nvidia-connectx-6-dx-en-hpe-datasheet.pdf, Aug. 2020, 3 pages.

Taranov, K., et al., "sRDMA-Efficient NIC-based Authentication and Encryption for Remote Direct Memory Access," Proceedings of the 2020 USENIX Annual Technical Conference, Jul. 15, 2020, 15 pages.

NVIDIA, NVIDIA BlueField—Data Processing Units, accessed from https://www.nvidia.com/en-us/networking/products/data-processing-unit/, printed on Aug. 11, 2022, 10 pages.

Broadcom, "Stingray PS225—Product Brief," accessed from https://docs.broadcom.com/doc/PS225-PB, Nov. 19, 2018, 2 pages.

Gu, J., et al., "Efficient Memory Disaggregation with Infiniswap," Proceedings of USENIX NSDI 2017, Mar. 27, 2017, 3 pages.

Lu, Y., et al., "Octopus: an RDMA-enabled Distributed Persistent Memory File System," USENIX Annual Technical Conference, Jul. 12, 2017, 15 pages.

Kalia, A., et al., "Using RDMA Efficiently for Key-Value Services," Proceedings of 2014 ACM Conference on Sigcomm (SIGCOMM"14), Aug. 17, 2014, 12 pages.

Pfefferle, J., et al., "A Hybrid I/O Virtualization Framework for RDMA-capable Network Interfaces," Proceedings of the ACM SIGPLAN/SIGOPS International Conference on Virtual Execution Environment , VEE"15, Mar. 14, 2015, 14 pages.

Linux Foundation, "OvS Open Switch," accessed from https://www.openvswitch.org, printed on Aug. 11, 2022, 2 pages.

Mellonox, "OVS Offload Using ASAP2 Direct", accessed from https://docs.mellanox.com/display/MLNXOFEDv471001/OVS+Offload+Using+ASAP2+Direct, printed on Aug. 11, 2022, 9 pages.

Callas, J., et al., "OpenPGP Message Format," Network Working Group, RFC 4880, Nov. 2007, 90 pages.

NVIDIA, "InfiniBand Architecture Specification, vol. 1, Release 1.2.1," Nov. 2017, 1,727 pages.

Rosenbaum, A., "[RFC] Roce v2.0 UDP Source Port Entropy," accessed from https://www.spinics.net/lists/linux-rdma/msg73735.html, Jan. 15, 2019, 3 pages.

Edgecore Networks, "DCS800—6.4T Programmable Data Center Switch," accessed from https://www.edge-core.com/productsInfo.phpid=335, printed on Aug. 11, 2022, 4 pages.

Azure, "Azure Monitor Agent overview", Aug. 11, 2022—accessed from https://docs.microsoft.com/en-us/azure/azure-monitor/agents/agents-overview, printed on Aug. 11, 2022, 16 pages.

* cited by examiner

Algorithm 1: Procedure for determining $A_{src}$ of an outgoing RDMA data packet

Input:
- $<GID_{src}, GID_{dst}, QP_{dst}, UDP\text{-}Port_{src}>$ extracted from the packet
- $<GID, QP, A>$ tuples from identity table

Output: $A_{src}$ of the packet for each $<QP, A>$ with $GID_{src}$ do
    $port = (QP[0..15]\ \textbf{XOR}\ QP_{dst}[0..15])\ \textbf{OR}\ 0xC000;$
    if $port == UDP\text{-}Port_{src}$ then
        return $A$;
    end
end

ZERO-TRUST AUTHENTICATION FOR SECURE REMOTE DIRECT MEMORY ACCESS

CROSS-REFERENCE TO RELATED APPLICATIONS

This application is a continuation of U.S. patent application Ser. No. 17/691,544, filed on Mar. 10, 2022, and entitled ZERO-TRUST AUTHENTICATION FOR SECURE REMOTE DIRECT MEMORY ACCESS, which is hereby incorporated by reference herein in its entirety.

TECHNICAL FIELD

Various example embodiments relate generally to communication systems and, more particularly but not exclusively, to communication between applications in communication systems.

BACKGROUND

In various contexts, various communications capabilities may be used to support various types of communications.

SUMMARY

In at least some example embodiments, an apparatus includes at least one processor and at least one memory including computer program code, wherein at least one memory and the computer program code are configured, with the at least one processor, to cause the apparatus to receive, by a device associated with a source application, a packet associated with a remote direct memory access connection between the source application and a destination application, determine, based on the packet, a set of application-level attributes associated with the source application, associate, with the packet to form a tagged packet, a tag including the set of application-level attributes associated with the source application, and send, from the device associated with the source application toward the destination application, the tagged packet. In at least some example embodiments, the packet includes a remote direct memory access connection message associated with establishment of the remote direct memory access connection. In at least some example embodiments, the direct memory access connection message is a Remote Direct Memory Access-Connection Manager (RDMA-CM) ConnectRequest message or ConnectReply message. In at least some example embodiments, to determine the set of application-level attributes associated with the source application, the at least one memory and the computer program code are configured, with the at least one processor, to cause the apparatus to determine, from the packet, a global identifier of the source application, determine, from the packet, a queue pair number of the source application, and retrieve, from an identity table based on a combination of the global identifier of the source application and the queue pair number of the source application, the set of application-level attributes associated with the source application. In at least some example embodiments, the global identifier of the source application is determined from a source address field of a header of the packet, and the queue pair number is determined from a payload of the packet. In at least some example embodiments, the packet is an initial remote direct memory access data packet sent on the remote direct memory access connection after establishment of the remote direct memory access connection using an out-of-band communication channel. In at least some example embodiments, to determine the set of application-level attributes associated with the source application, the at least one memory and the computer program code are configured, with the at least one processor, to cause the apparatus to determine, from the packet, a global identifier of the source application, a global identifier of the destination application, a queue pair of the destination application, and a user datagram protocol port of the source application and determine, based on the global identifier of the source application, the global identifier of the destination application, the queue pair of the destination application, and the user datagram protocol port of the source application, the set of application-level attributes associated with the source application. In at least some example embodiments, to determine the set of application-level attributes associated with the source application, the at least one memory and the computer program code are configured, with the at least one processor, to cause the apparatus to identify, based on the global identifier of the source application, a set of potential tuples for the source application, wherein each potential tuple in the set of potential tuples includes a respective queue pair of the source application and a respective set of application-level attributes associated with the source application and identify, based on selection of one of the potential tuples based on a relationship between respective queue pairs of the source application and the destination application and a port of the source application, the set of application-level attributes associated with the source application. In at least some example embodiments, the at least one memory and the computer program code are configured, with the at least one processor, to cause the apparatus to obtain a signed set of application-level attributes of the source application, wherein the signed set of application-level attributes of the source application is based on signing of the set of application-level attributes of the source application based on a private key of the device associated with the source application, encrypt, based on a secret key of the device associated with the source application, the signed set of application-level attributes of the source application to form an encrypted set of application-level attributes of the source application, encrypt, based on a public key of a device associated with the destination application, the secret key to form an encrypted secret key, and include, within the tag, the encrypted set of application-level attributes of the source application and the encrypted secret key. In at least some example embodiments, to obtain the signed set of application-level attributes of the source application, the at least one memory and the computer program code are configured, with the at least one processor, to cause the apparatus to obtain, by the source device, the set of application-level attributes of the source application and sign, by the source device based on the private key of the source device, the set of application-level attributes of the source application to form the signed set of application-level attributes of the source application. In at least some example embodiments, to obtain the signed set of application-level attributes of the source application, the at least one memory and the computer program code are configured, with the at least one processor, to cause the apparatus to retrieve, from an identity table maintained on the source device, the signed set of application-level attributes of the source application. In at least some example embodiments, the device associated with the source application includes a network interface card or a switch.

In at least some example embodiments, a non-transitory computer-readable medium stores computer program code configured to cause an apparatus to receive, by a device associated with a source application, a packet associated with a remote direct memory access connection between the source application and a destination application, determine, based on the packet, a set of application-level attributes associated with the source application, associate, with the packet to form a tagged packet, a tag including the set of application-level attributes associated with the source application, and send, from the device associated with the source application toward the destination application, the tagged packet. In at least some example embodiments, the packet includes a remote direct memory access connection message associated with establishment of the remote direct memory access connection. In at least some example embodiments, the direct memory access connection message is a Remote Direct Memory Access-Connection Manager (RDMA-CM) ConnectRequest message or ConnectReply message. In at least some example embodiments, to determine the set of application-level attributes associated with the source application, the computer program code is configured to cause the apparatus to determine, from the packet, a global identifier of the source application, determine, from the packet, a queue pair number of the source application, and retrieve, from an identity table based on a combination of the global identifier of the source application and the queue pair number of the source application, the set of application-level attributes associated with the source application. In at least some example embodiments, the global identifier of the source application is determined from a source address field of a header of the packet, and the queue pair number is determined from a payload of the packet. In at least some example embodiments, the packet is an initial remote direct memory access data packet sent on the remote direct memory access connection after establishment of the remote direct memory access connection using an out-of-band communication channel. In at least some example embodiments, to determine the set of application-level attributes associated with the source application, the computer program code is configured to cause the apparatus to determine, from the packet, a global identifier of the source application, a global identifier of the destination application, a queue pair of the destination application, and a user datagram protocol port of the source application and determine, based on the global identifier of the source application, the global identifier of the destination application, the queue pair of the destination application, and the user datagram protocol port of the source application, the set of application-level attributes associated with the source application. In at least some example embodiments, to determine the set of application-level attributes associated with the source application, the computer program code is configured to cause the apparatus to identify, based on the global identifier of the source application, a set of potential tuples for the source application, wherein each potential tuple in the set of potential tuples includes a respective queue pair of the source application and a respective set of application-level attributes associated with the source application and identify, based on selection of one of the potential tuples based on a relationship between respective queue pairs of the source application and the destination application and a port of the source application, the set of application-level attributes associated with the source application. In at least some example embodiments, the computer program code is configured to cause the apparatus to obtain a signed set of application-level attributes of the source application, wherein the signed set of application-level attributes of the source application is based on signing of the set of application-level attributes of the source application based on a private key of the device associated with the source application, encrypt, based on a secret key of the device associated with the source application, the signed set of application-level attributes of the source application to form an encrypted set of application-level attributes of the source application, encrypt, based on a public key of a device associated with the destination application, the secret key to form an encrypted secret key, and include, within the tag, the encrypted set of application-level attributes of the source application and the encrypted secret key. In at least some example embodiments, to obtain the signed set of application-level attributes of the source application, the computer program code is configured to cause the apparatus to obtain, by the source device, the set of application-level attributes of the source application and sign, by the source device based on the private key of the source device, the set of application-level attributes of the source application to form the signed set of application-level attributes of the source application. In at least some example embodiments, to obtain the signed set of application-level attributes of the source application, the computer program code is configured to cause the apparatus to retrieve, from an identity table maintained on the source device, the signed set of application-level attributes of the source application. In at least some example embodiments, the device associated with the source application includes a network interface card or a switch.

In at least some example embodiments, a method includes receiving, by a device associated with a source application, a packet associated with a remote direct memory access connection between the source application and a destination application, determining, based on the packet, a set of application-level attributes associated with the source application, associating, with the packet to form a tagged packet, a tag including the set of application-level attributes associated with the source application, and sending, from the device associated with the source application toward the destination application, the tagged packet. In at least some example embodiments, the packet includes a remote direct memory access connection message associated with establishment of the remote direct memory access connection. In at least some example embodiments, the direct memory access connection message is a Remote Direct Memory Access-Connection Manager (RDMA-CM) ConnectRequest message or ConnectReply message. In at least some example embodiments, determining the set of application-level attributes associated with the source application includes determining, from the packet, a global identifier of the source application, determining, from the packet, a queue pair number of the source application, and retrieving, from an identity table based on a combination of the global identifier of the source application and the queue pair number of the source application, the set of application-level attributes associated with the source application. In at least some example embodiments, the global identifier of the source application is determined from a source address field of a header of the packet, and the queue pair number is determined from a payload of the packet. In at least some example embodiments, the packet is an initial remote direct memory access data packet sent on the remote direct memory access connection after establishment of the remote direct memory access connection using an out-of-band communication channel. In at least some example embodiments, determining the set of application-level attributes associated with the source application includes determining, from the packet, a global identifier of the source application, a global identifier of the destination application, a queue pair of the destination application, and a user datagram protocol port of the source application and determining, based on the global identifier of the source application, the global identifier of the destination application, the queue pair of the destination application, and the user datagram protocol port of the source application, the set of application-level attributes associated with the source application. In at least some example embodiments, determining the set of application-level attributes associated with the source application includes identifying, based on the global identifier of the source application, a set of potential tuples for the source application, wherein each potential tuple in the set of potential tuples includes a respective queue pair of the source application and a respective set of application-level attributes associated with the source application and identifying, based on selection of one of the potential tuples based on a relationship between respective queue pairs of the source application and the destination application and a port of the source application, the set of application-level attributes associated with the source application. In at least some example embodiments, the method includes obtaining a signed set of application-level attributes of the source application, wherein the signed set of application-level attributes of the source application is based on signing of the set of application-level attributes of the source application based on a private key of the device associated with the source application, encrypting, based on a secret key of the device associated with the source application, the signed set of application-level attributes of the source application to form an encrypted set of application-level attributes of the source application, encrypting, based on a public key of a device associated with the destination application, the secret key to form an encrypted secret key, and including, within the tag, the encrypted set of application-level attributes of the source application and the encrypted secret key. In at least some example embodiments, obtaining the signed set of application-level attributes of the source application includes obtaining, by the source device, the set of application-level attributes of the source application and signing, by the source device based on the private key of the source device, the set of application-level attributes of the source application to form the signed set of application-level attributes of the source application. In at least some example embodiments, obtaining the signed set of application-level attributes of the source application includes retrieving, from an identity table maintained on the source device, the signed set of application-level attributes of the source application. In at least some example embodiments, the device associated with the source application includes a network interface card or a switch.

In at least some example embodiments, an apparatus includes means for receiving, by a device associated with a source application, a packet associated with a remote direct memory access connection between the source application and a destination application, means for determining, based on the packet, a set of application-level attributes associated with the source application, means for associating, with the packet to form a tagged packet, a tag including the set of application-level attributes associated with the source application, and means for sending, from the device associated with the source application toward the destination application, the tagged packet. In at least some example embodiments, the packet includes a remote direct memory access connection message associated with establishment of the remote direct memory access connection. In at least some example embodiments, the direct memory access connection message is a Remote Direct Memory Access-Connection Manager (RDMA-CM) ConnectRequest message or ConnectReply message. In at least some example embodiments, the means for determining the set of application-level attributes associated with the source application includes means for determining, from the packet, a global identifier of the source application, means for determining, from the packet, a queue pair number of the source application, and means for retrieving, from an identity table based on a combination of the global identifier of the source application and the queue pair number of the source application, the set of application-level attributes associated with the source application. In at least some example embodiments, the global identifier of the source application is determined from a source address field of a header of the packet, and the queue pair number is determined from a payload of the packet. In at least some example embodiments, the packet is an initial remote direct memory access data packet sent on the remote direct memory access connection after establishment of the remote direct memory access connection using an out-of-band communication channel. In at least some example embodiments, the means for determining the set of application-level attributes associated with the source application includes means for determining, from the packet, a global identifier of the source application, a global identifier of the destination application, a queue pair of the destination application, and a user datagram protocol port of the source application and means for determining, based on the global identifier of the source application, the global identifier of the destination application, the queue pair of the destination application, and the user datagram protocol port of the source application, the set of application-level attributes associated with the source application. In at least some example embodiments, the means for determining the set of application-level attributes associated with the source application includes means for identifying, based on the global identifier of the source application, a set of potential tuples for the source application, wherein each potential tuple in the set of potential tuples includes a respective queue pair of the source application and a respective set of application-level attributes associated with the source application and means for identifying, based on selection of one of the potential tuples based on a relationship between respective queue pairs of the source application and the destination application and a port of the source application, the set of application-level attributes associated with the source application. In at least some example embodiments, the apparatus includes means for obtaining a signed set of application-level attributes of the source application, wherein the signed set of application-level attributes of the source application is based on signing of the set of application-level attributes of the source application based on a private key of the device associated with the source application, means for encrypting, based on a secret key of the device associated with the source application, the signed set of application-level attributes of the source application to form an encrypted set of application-level attributes of the source application, means for encrypting, based on a public key of a device associated with the destination application, the secret key to form an encrypted secret key, and means for including, within the tag, the encrypted set of application-level attributes of the source application and the encrypted secret key. In at least some example embodiments, the means for obtaining the signed set of application-level attributes of the source application includes means for obtaining, by the source device, the set of application-level attributes of the source application and means for signing, by the source device based on the private key of the source device, the set of application-level attributes of the source application to form the signed set of application-level attributes of the source application. In at least some example embodiments, the means for obtaining the signed set of application-level attributes of the source application includes means for retrieving, from an identity table maintained on the source device, the signed set of application-level attributes of the source application. In at least some example embodiments, the device associated with the source application includes a network interface card or a switch.

In at least some example embodiments, an apparatus includes at least one processor and at least one memory including computer program code, wherein at least one memory and the computer program code are configured, with the at least one processor, to cause the apparatus to receive, by a device associated with a destination application, a packet associated with a remote direct memory access connection between a source application and the destination application, determine, based on the packet, a set of application-level attributes associated with the source application and a set of application-level attributes associated with the destination application, identify, based on the set of application-level attributes associated with the source application and the set of application-level attributes associated with the destination application, a policy, and perform, based on the policy, a policy enforcement action. In at least some example embodiments, the packet is a remote direct memory access connection message associated with establishment of the remote direct memory access connection. In at least some example embodiments, the direct memory access connection message is a Remote Direct Memory Access-Connection Manager (RDMA-CM) ConnectRequest message or ConnectReply message. In at least some example embodiments, the remote direct memory access connection message is a connection request message and, to determine the set of application-level attributes associated with the destination application, the at least one memory and the computer program code are configured, with the at least one processor, to cause the apparatus to obtain, from a destination port field of the connection request message, a destination port, wherein the destination port was previously allocated by the destination application to bind its service for supporting discovery of the service, determine, based on the destination port, a process identifier of the destination application, and retrieve, from an identity table based on the process identifier of the destination application, the set of application-level attributes of the destination application. In at least some example embodiments, the remote direct memory access connection message is a connection reply message and, to determine the set of application-level attributes of the destination application, the at least one memory and the computer program code are configured, with the at least one processor, to cause the apparatus to maintain a mapping of a local communication identifier of an outgoing connection message to a set of application-level attributes, obtain, from a remote communication identifier field of the connection reply message, a remote communication identifier, and use, based on a matching of the remote communication identifier to the local communication identifier, the set of application-level attributes as the set of application-level attributes of the destination application. In at least some example embodiments, the packet is an initial remote direct memory access data packet sent on the remote direct memory access connection after establishment of the remote direct memory access connection using an out-of-band communication channel. In at least some example embodiments, to determine the set of application-level attributes associated with the destination application, the at least one memory and the computer program code are configured, with the at least one processor, to cause the apparatus to determine, from the packet, a global identifier of the destination application, determine, from a base transport header of the packet, a queue pair of the destination application, and retrieve, from an identity table based on a combination of global identifier of the destination application and the queue pair of the destination application, the set of application-level attributes associated with the destination application. In at least some example embodiments, to determine the set of application-level attributes associated with the destination application, the at least one memory and the computer program code are configured, with the at least one processor, to cause the apparatus to extract, from the packet, an encrypted set of application-level attributes of the source application and an encrypted secret key, decrypt, based on a private key of the device associated with the destination application, the encrypted secret key to recover a secret key, decrypt, based on the secret key, the encrypted set of application-level attributes of the source application to recover a signed set of application-level attributes of the source application, and verify, based on a public key of a device associated with the source application, authenticity of the signed set of application-level attributes of the source application. In at least some example embodiments, to perform the policy enforcement action, the at least one memory and the computer program code are configured, with the at least one processor, to cause the apparatus to control, based on the policy, establishment of the remote direct memory access connection between the source application and the destination application. In at least some example embodiments, to perform the policy enforcement action, the at least one memory and the computer program code are configured, with the at least one processor, to cause the apparatus to generate, based on the policy, a copy of the packet and forward the copy of packet toward a monitoring system for logging the remote direct memory access connection for auditing. In at least some example embodiments, the device associated with the destination application includes a network interface card or a switch.

In at least some example embodiments, a non-transitory computer-readable medium stores computer program code configured to cause an apparatus to receive, by a device associated with a destination application, a packet associated with a remote direct memory access connection between a source application and the destination application, determine, based on the packet, a set of application-level attributes associated with the source application and a set of application-level attributes associated with the destination application, identify, based on the set of application-level attributes associated with the source application and the set of application-level attributes associated with the destination application, a policy, and perform, based on the policy, a policy enforcement action. In at least some example embodiments, the packet is a remote direct memory access connection message associated with establishment of the remote direct memory access connection. In at least some example embodiments, the direct memory access connection message is a Remote Direct Memory Access-Connection Manager (RDMA-CM) ConnectRequest message or ConnectReply message. In at least some example embodiments, the remote direct memory access connection message is a connection request message and, to determine the set of application-level attributes associated with the destination application, the computer program code is configured to cause the apparatus to obtain, from a destination port field of the connection request message, a destination port, wherein the destination port was previously allocated by the destination application to bind its service for supporting discovery of the service, determine, based on the destination port, a process identifier of the destination application, and retrieve, from an identity table based on the process identifier of the destination application, the set of application-level attributes of the destination application. In at least some example embodiments, the remote direct memory access connection message is a connection reply message and, to determine the set of application-level attributes of the destination application, the computer program code is configured to cause the apparatus to maintain a mapping of a local communication identifier of an outgoing connection message to a set of application-level attributes, obtain, from a remote communication identifier field of the connection reply message, a remote communication identifier, and use, based on a matching of the remote communication identifier to the local communication identifier, the set of application-level attributes as the set of application-level attributes of the destination application. In at least some example embodiments, the packet is an initial remote direct memory access data packet sent on the remote direct memory access connection after establishment of the remote direct memory access connection using an out-of-band communication channel. In at least some example embodiments, to determine the set of application-level attributes associated with the destination application, the computer program code is configured to cause the apparatus to determine, from the packet, a global identifier of the destination application, determine, from a base transport header of the packet, a queue pair of the destination application, and retrieve, from an identity table based on a combination of global identifier of the destination application and the queue pair of the destination application, the set of application-level attributes associated with the destination application. In at least some example embodiments, to determine the set of application-level attributes associated with the destination application, the computer program code is configured to cause the apparatus to extract, from the packet, an encrypted set of application-level attributes of the source application and an encrypted secret key, decrypt, based on a private key of the device associated with the destination application, the encrypted secret key to recover a secret key, decrypt, based on the secret key, the encrypted set of application-level attributes of the source application to recover a signed set of application-level attributes of the source application, and verify, based on a public key of a device associated with the source application, authenticity of the signed set of application-level attributes of the source application. In at least some example embodiments, to perform the policy enforcement action, the computer program code is configured to cause the apparatus to control, based on the policy, establishment of the remote direct memory access connection between the source application and the destination application. In at least some example embodiments, to perform the policy enforcement action, the computer program code is configured to cause the apparatus to generate, based on the policy, a copy of the packet and forward the copy of packet toward a monitoring system for logging the remote direct memory access connection for auditing. In at least some example embodiments, the device associated with the destination application includes a network interface card or a switch.

In at least some example embodiments, a method includes receiving, by a device associated with a destination application, a packet associated with a remote direct memory access connection between a source application and the destination application, determining, based on the packet, a set of application-level attributes associated with the source application and a set of application-level attributes associated with the destination application, identifying, based on the set of application-level attributes associated with the source application and the set of application-level attributes associated with the destination application, a policy, and performing, based on the policy, a policy enforcement action. In at least some example embodiments, the packet is a remote direct memory access connection message associated with establishment of the remote direct memory access connection. In at least some example embodiments, the direct memory access connection message is a Remote Direct Memory Access-Connection Manager (RDMA-CM) ConnectRequest message or ConnectReply message. In at least some example embodiments, the remote direct memory access connection message is a connection request message, and determining the set of application-level attributes associated with the destination application includes obtaining, from a destination port field of the connection request message, a destination port, wherein the destination port was previously allocated by the destination application to bind its service for supporting discovery of the service, determining, based on the destination port, a process identifier of the destination application, and retrieving, from an identity table based on the process identifier of the destination application, the set of application-level attributes of the destination application. In at least some example embodiments, the remote direct memory access connection message is a connection reply message, and determining the set of application-level attributes of the destination application includes maintaining a mapping of a local communication identifier of an outgoing connection message to a set of application-level attributes, obtaining, from a remote communication identifier field of the connection reply message, a remote communication identifier, and using, based on a matching of the remote communication identifier to the local communication identifier, the set of application-level attributes as the set of application-level attributes of the destination application. In at least some example embodiments, the packet is an initial remote direct memory access data packet sent on the remote direct memory access connection after establishment of the remote direct memory access connection using an out-of-band communication channel. In at least some example embodiments, determining the set of application-level attributes associated with the destination application includes determining, from the packet, a global identifier of the destination application, determining, from a base transport header of the packet, a queue pair of the destination application, and retrieving, from an identity table based on a combination of global identifier of the destination application and the queue pair of the destination application, the set of application-level attributes associated with the destination application. In at least some example embodiments, determining the set of application-level attributes associated with the destination application includes extracting, from the packet, an encrypted set of application-level attributes of the source application and an encrypted secret key, decrypting, based on a private key of the device associated with the destination application, the encrypted secret key to recover a secret key, decrypting, based on the secret key, the encrypted set of application-level attributes of the source application to recover a signed set of application-level attributes of the source application, and verifying, based on a public key of a device associated with the source application, authenticity of the signed set of application-level attributes of the source application. In at least some example embodiments, performing the policy enforcement action includes controlling, based on the policy, establishment of the remote direct memory access connection between the source application and the destination application. In at least some example embodiments, performing the policy enforcement action includes generating, based on the policy, a copy of the packet and forwarding the copy of packet toward a monitoring system for logging the remote direct memory access connection for auditing. In at least some example embodiments, the device associated with the destination application includes a network interface card or a switch.

In at least some example embodiments, an apparatus includes means for receiving, by a device associated with a destination application, a packet associated with a remote direct memory access connection between a source application and the destination application, means for determining, based on the packet, a set of application-level attributes associated with the source application and a set of application-level attributes associated with the destination application, means for identifying, based on the set of application-level attributes associated with the source application and the set of application-level attributes associated with the destination application, a policy, and means for performing, based on the policy, a policy enforcement action. In at least some example embodiments, the packet is a remote direct memory access connection message associated with establishment of the remote direct memory access connection. In at least some example embodiments, the direct memory access connection message is a Remote Direct Memory Access-Connection Manager (RDMA-CM) ConnectRequest message or ConnectReply message. In at least some example embodiments, the remote direct memory access connection message is a connection request message, and the means for determining the set of application-level attributes associated with the destination application includes means for obtaining, from a destination port field of the connection request message, a destination port, wherein the destination port was previously allocated by the destination application to bind its service for supporting discovery of the service, means for determining, based on the destination port, a process identifier of the destination application, and means for retrieving, from an identity table based on the process identifier of the destination application, the set of application-level attributes of the destination application. In at least some example embodiments, the remote direct memory access connection message is a connection reply message, and the means for determining the set of application-level attributes of the destination application includes means for maintaining a mapping of a local communication identifier of an outgoing connection message to a set of application-level attributes, means for obtaining, from a remote communication identifier field of the connection reply message, a remote communication identifier, and means for using, based on a matching of the remote communication identifier to the local communication identifier, the set of application-level attributes as the set of application-level attributes of the destination application. In at least some example embodiments, the packet is an initial remote direct memory access data packet sent on the remote direct memory access connection after establishment of the remote direct memory access connection using an out-of-band communication channel. In at least some example embodiments, the means for determining the set of application-level attributes associated with the destination application includes means for determining, from the packet, a global identifier of the destination application, means for determining, from a base transport header of the packet, a queue pair of the destination application, and means for retrieving, from an identity table based on a combination of global identifier of the destination application and the queue pair of the destination application, the set of application-level attributes associated with the destination application. In at least some example embodiments, the means for determining the set of application-level attributes associated with the destination application includes means for extracting, from the packet, an encrypted set of application-level attributes of the source application and an encrypted secret key, means for decrypting, based on a private key of the device associated with the destination application, the encrypted secret key to recover a secret key, means for decrypting, based on the secret key, the encrypted set of application-level attributes of the source application to recover a signed set of application-level attributes of the source application, and means for verifying, based on a public key of a device associated with the source application, authenticity of the signed set of application-level attributes of the source application. In at least some example embodiments, the means for performing the policy enforcement action includes means for controlling, based on the policy, establishment of the remote direct memory access connection between the source application and the destination application. In at least some example embodiments, the means for performing the policy enforcement action includes means for generating, based on the policy, a copy of the packet and means for forwarding the copy of packet toward a monitoring system for logging the remote direct memory access connection for auditing. In at least some example embodiments, the device associated with the destination application includes a network interface card or a switch.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for supporting zero-trust policy enforcement in a communication system are presented herein. Various example embodiments for supporting zero-trust policy enforcement in a communication system may be configured to support zero-trust policy enforcement, including zero-trust authentication, for Remote Direct Memory Access (RDMA) communications. Various example embodiments for supporting zero-trust policy enforcement for RDMA communications may be configured to support transparent zero-trust policy enforcement for RDMA communications by leveraging programmable Smart Network Interface Cards (SmartNICs). Various example embodiments for supporting zero-trust policy enforcement for RDMA communications based on leveraging of programmable SmartNICs may be configured to support zero-trust policy enforcement for RDMA communications by applying zero-trust policies on a connection-by-connection basis within SmartNICs for RDMA connections between RDMA applications hosted on end hosts served by the SmartNICs. Various example embodiments for supporting zero-trust authentication for RDMA communications based on leveraging of programmable SmartNICs may be configured to support zero-trust authentication for RDMA communications by applying fine-grained, application-dependent zero-trust authentication policies to RDMA communications within SmartNICs, thereby overcoming potential problems associated with application of zero-trust security policies for RDMA traffic based on existing network-based access control mechanisms being tied to network locations. Various example embodiments for supporting zero-trust policy enforcement for RDMA communications based on leveraging of programmable SmartNICs may be configured to support zero-trust policy enforcement for RDMA communications without changing or redeploying existing RDMA applications, without requiring any change to the RDMA protocol or hardwired RDMA offload mechanisms, and so forth. Various example embodiments for supporting zero-trust policy enforcement for RDMA communications may be configured to support zero-trust policy enforcement for RDMA communications in various contexts, such as within various types of communication networks in which RDMA communications may be employed (e.g., data center networks, enterprise networks, or the like). It will be appreciated that these and various other example embodiments and advantages or potential advantages of supporting zero-trust policy enforcement in a communication system may be further understood by way of reference to the various figures, which are discussed further below.

Figure 1:
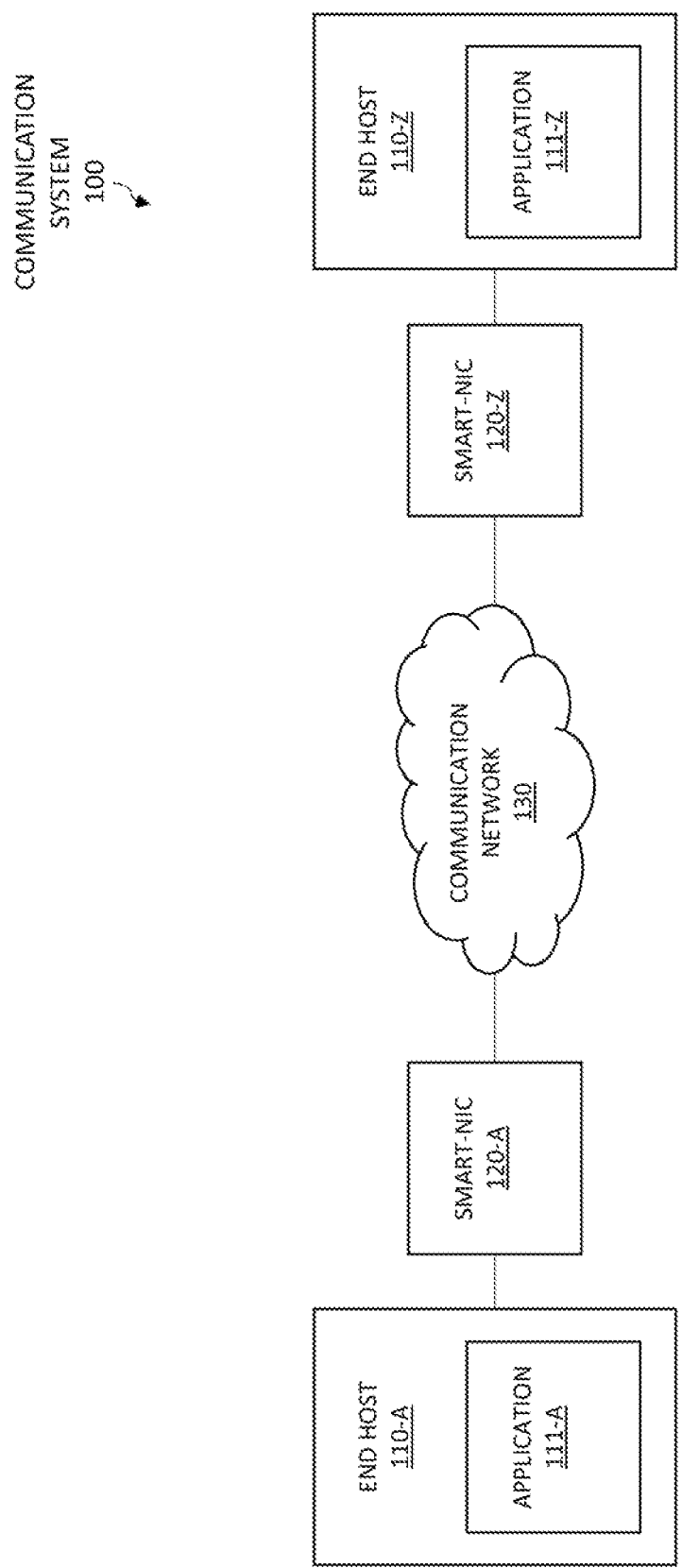
FIG. 1 depicts an example embodiment of a communication system configured to support use of zero-trust authentication capabilities for securing Remote Direct Memory Access (RDMA) communications of RDMA applications.

FIG. 1 depicts an example embodiment of a communication system configured to support use of zero-trust policy enforcement capabilities for securing Remote Direct Memory Access (RDMA) communications of RDMA applications.

The communication system 100 includes a pair of end hosts 110-A and 110-Z (collectively, end hosts 110) hosting a pair of applications 111-A and 111-Z (collectively, applications 111), respectively, a pair of Smart Network Interface Cards (SmartNICs) 120-A and 120-Z (collectively, SmartNICs 120) associated with end hosts 110-A and 110-Z, respectively, and a communication network 130.

The communication system 100 may be configured to support communications between the applications 111 of the ends hosts 110 based on use of Remote Direct Memory Access (RDMA). In this case, the applications 111 of the end hosts 110 may be RDMA application endpoints configured to support communications based on RDMA.

The communication system 100 may be any type of communication system which may utilize RDMA for communications between applications. For example, the communication system 100 may represent a data center (e.g., with the end hosts 110 representing servers in the data center and the communication network 130 being a data center communication network including various switches and routers and associated networking infrastructure), an enterprise network (e.g., with the end hosts 110 representing enterprise communication endpoints and the communication network 130 being an enterprise network which may include physical and/or virtualized communication resources owned or leased by the enterprise), or the like.

The communication system 100 may be configured to support RDMA communications in various contexts. For example, RDMA communications may be particularly well-suited for various types of application workloads, such as machine learning and scientific computing tasks, production-scale cloud storage, multi-tenant infrastructure-as-a-service, performance-demanding online services, and so forth. It will be appreciated that RDMA communications may be used for support various other types of workloads, RDMA communications may be applied in various other contexts, or the like, as well as various combinations thereof.

The communication system 100, as indicated above, may be configured to support RDMA communications. In general, the most widely available RDMA deployments for general-purpose data center workloads today are based on RDMA over Converged Ethernet (RoCE), which implements RDMA over Ethernet fabric, either at Layer-2 (RoCEv1) or at Layer-3 with User Datagram Protocol (UDP) encapsulation (RoCEv2). This means that zero-trust security policies for RDMA traffic can be implemented with the traditional network-based access control mechanisms built for Ethernet/Internet Protocol (IP) networks, where network firewalls selectively allow or block RDMA traffic based on network-endpoint properties (e.g., source/destination IP addresses in the case of RoCEv1 and UDP ports in case of RoCEv2); however, applying such network-based segmentation to achieve zero-trust access control on RDMA is expected to have various drawbacks.

First, for example, the straightforward adoption of network-based access control would make zero-trust policies be tied to network locations, whereas prevailing zero-trust models are trying to move trust away from network locations to focus more on the actual resources being protected, as network locations are ephemeral attributes of the resources that can change at any time. As such, in order to support network-independent zero-trust security, first such policies (e.g., only RDMA resource "X" can talk to RDMA resource "Y") need to be translated into corresponding network-endpoint rules (e.g., only <IP-addr1:UDP-port1> can access <IP-addr2:UDPport2> for RoCEv2), which are then enforced by network firewalls. This semantic gap between network-independent zero-trust policies and network-based policy enforcement primitives makes the approach inherently fragile and error-prone.

Second, for example, network-based segmentation is particularly problematic for RDMA traffic, because RDMA applications typically create multiple RDMA connections to the same destination node for load balancing and reliability purposes or for separate data/control channel communications. RDMA-capable network interface cards (RNICs) allow a single process to create from 32K up to well over 250K RDMA connections to the same destination node. With RoCEv2, when a process creates multiple RDMA sessions to the same destination, each of these sessions is mapped to a distinct UDP flow with the same destination IP address but a distinct UDP port. Microflow access control rules for such individual UDP flows cannot be aggregated with wildcard rules, when multiple RDMA applications with distinct access control policies are running behind the same destination IP address. In large-scale RDMA deployments, the sheer number of non-aggregable microflow rules to maintain and update makes it difficult to scale network-based segmentation.

The communication system 100 may be configured to support zero-trust authentication for RDMA communications of the communication system 100. The communication system 100 may be configured to support zero-trust authentication for RDMA communications of the communication system 100 by enabling RDMA communications to be properly isolated and protected with granular control as advocated by many modern zero-trust security models. For example, the SmartNICs 120 may be configured to support zero-trust authentication for RDMA communications of the applications 111 of the end hosts 110 based on control over RDMA connection establishment between the applications 111 of the end hosts 110. It will be appreciated that the manner in which the SmartNICs 120 may be configured to support zero-trust authentication for RDMA communications of the applications 111 of the end hosts 110, based on control over RDMA connection establishment between the applications 111 of the end hosts 110, may be further understood by way of reference to FIG. 2.

Figure 2:
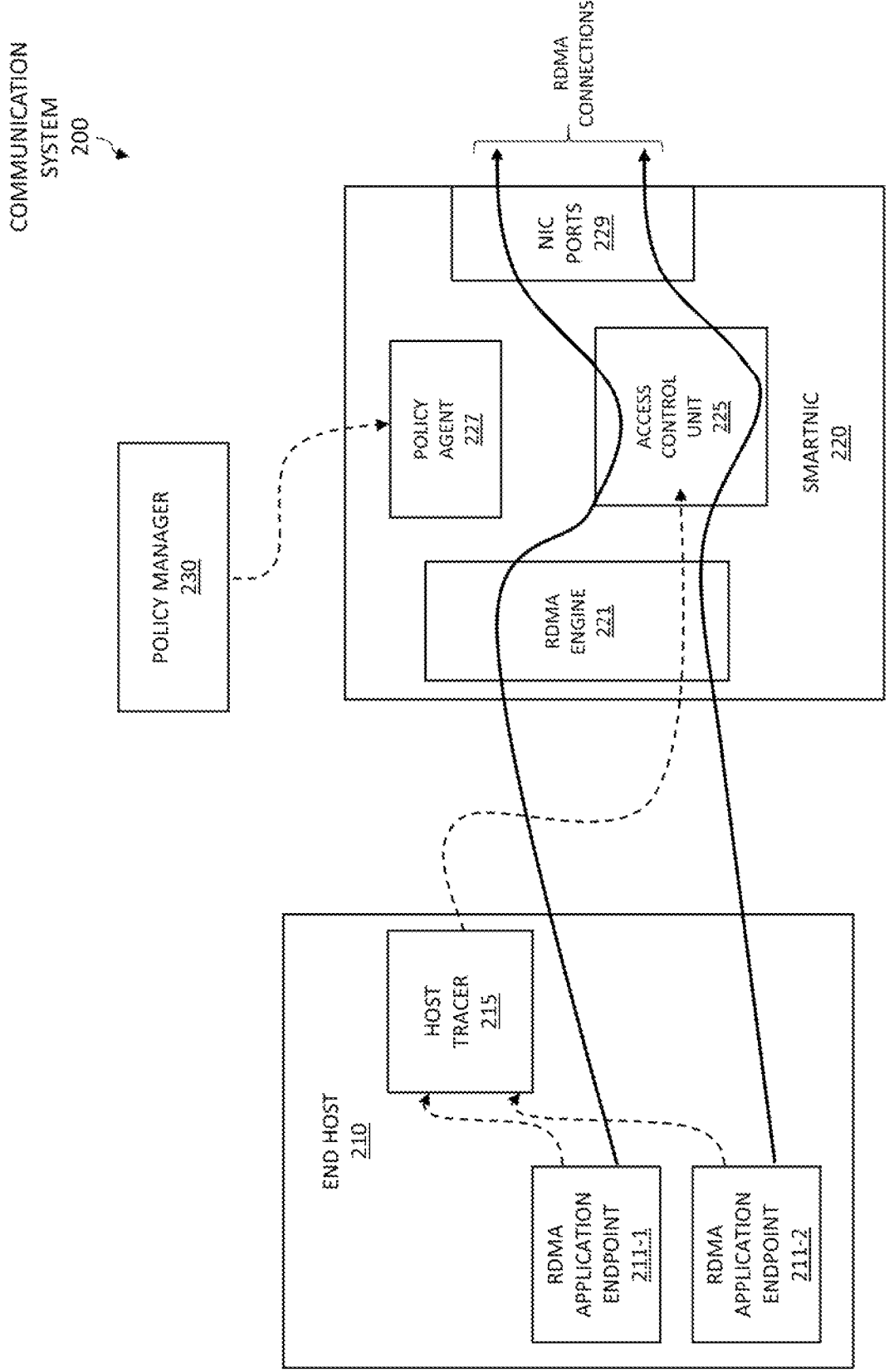
FIG. 2 depicts an example embodiment of a communication system configured to support use of zero-trust policy enforcement capabilities for securing RDMA communications of RDMA applications.

FIG. 2 depicts an example embodiment of a communication system configured to support use of zero-trust authentication capabilities for securing RDMA communications of RDMA applications.

The communication system 200 includes an end host 210, a SmartNIC 220, and a Policy Manager 230. The end host 210 includes a pair of RDMA applications 211-1 and 211-2 (collectively, RDMA applications 211) and a Host Tracer 215. The SmartNIC 220 includes an RDMA Engine 221, an Access Control Unit (ACU) 225, a Policy Agent 227, and NIC ports 229. The communication system 200 supports a pair of RDMA sessions 240-1 and 240-2 (collectively, RDMA sessions 240) associated with the RDMA applications 211-1 and 211-2 of the end host 210, respectively.

The end host 210 may correspond to the end host 110 of FIG. 1. The end host 210, as indicated above, includes the pair of RDMA applications 211 and the Host Tracer 215.

The RDMA applications 211-1 and 211-2, as indicated above, operate as endpoints of the associated RDMA sessions 240-1 and 240-2, respectively, which are established for supporting RDMA communications with remote RDMA applications (which are omitted from FIG. 2 for purposes of clarity). It will be appreciated that, although two RDMA applications 211 are depicted, the end host 210 may include fewer or more RDMA applications 211.

The Host Tracer 215 is a privileged software module that is installed the end host 210 to (1) monitor RDMA endpoints created/destroyed by deployed RDMA applications (illustratively, RDMA applications 211), and (2) detect any application-level attributes associated with the RDMA endpoints. The Host Tracer 215, after collecting information on RDMA endpoints and the associated application-level attributes of the RDMA endpoints, sends the collected information to the ACU 225 in a SmartNIC 220.

The Host Tracer 215, as indicated above, monitors individual RDMA endpoints that are created and destroyed by deployed applications. A local endpoint of RDMA communication is represented by a combination of a global identifier (GID) and a queue pair number (QPN), which may be referred to as a <GID, QPN> tuple. The GID is a globally unique identifier assigned to a physical port of an RNIC. A QPN identifies a pair of specific send/receive queues (denoted as a queue pair (QP)) dynamically created for RDMA data exchange. The Host Tracer 215, with real-time tracing, identifies associations between <GID, QPN> tuples and application process identifiers (PIDs). The Host Tracer 215, in addition to this information, also collects application-specific attribute(s) associated with the RDMA endpoints. For example, such application-specific attributes may include application names and/or application-specific contexts determined at run-time and vary across different applications (e.g., remote block device name with RDMA-based remote paging, client ID with RDMA storage services, virtualized guest ID with RDMA virtualization, and so forth). For example, attributes associated with application deployment environments also may be used (e.g. tenant ID, RDMA software stack version, and so forth). It will be appreciated that various other types of application-specific attributes may be collected and used.

The Host Tracer 215, as different types of application-specific attributes or contexts are collected differently, may utilize a combination of multiple distinct tracing/querying primitives to discover the different types of application-specific attributes or contexts. For example, the Host Tracer 215 can rely on Extended Berkley Packet Filter (eBPF)-based in-kernel tracers to monitor QP creation events, eBPF helpers to query run-time contexts such as PID/user identifier (UID) from the kernel, centralized orchestrator interfaces (e.g., Kubernetes APIs) to query tenant information for deployed applications, or the like, as well as various combinations thereof.

The Host Tracer 215 may organize the collected tracing results in the form of <PID, GID, QPN, A> tuples, where A denotes a set of application-level attributes for a given <PID> or <GID, QPN>. It will be appreciated that the collected tracing results may be organized and maintained in various other ways.

The Host Tracer 215, after collecting information on RDMA endpoints and the associated application-level attributes of the RDMA endpoints, sends the collected information to the ACU 225 in a SmartNIC 220. The Host Tracer 215 may provide the application-level attributes of the RDMA endpoints to the ACU 225 in the SmartNIC 220 in the form of the <PID, GID, QPN, A> tuples, where A is a set of application-level attributes. The Host Tracer 215 may provide the application-level attributes of the RDMA endpoints to the ACU 225 in the SmartNIC 220 as the application-level attributes are discovered in real time.

It will be appreciated that the end host 210 may include various other elements or modules which have been omitted from FIG. 2 for purposes of clarity.

The SmartNIC 220 may correspond to the SmartNIC 120 of FIG. 1. The SmartNIC 220, as indicated above, includes the RDMA Engine 221, the ACU 225, the Policy Agent 227, and the NIC ports 229. The RDMA sessions 240 each traverse the RDMA Engine 221, the ACU 225, and the NIC ports 229.

The SmartNIC 220 may be configured to support enforcement of zero-trust security policies for RDMA communications. The zero-trust security policies may define access control on RDMA traffic based on application-level attributes associated with the traffic. The zero-trust security policies may be defined in the form of <$A_{src}$, $A_{dst}$, Action>, where $A_{src}$ is a set of application-level attributes associated with the source RDMA application, $A_{dst}$ is a set of application-level attributes associated with the destination RDMA application, and Action is the policy action to be performed for the RDMA connection between the source RDMA application and the destination RDMA application based on the set of application-level attributes $A_{src}$ associated with the source RDMA application and the set of application-level attributes $A_{dst}$ associated with the destination RDMA application. The policy may be configured to support control over establishment of the RDMA connection between the source RDMA application and the destination RDMA application (e.g., the policy action of the policy may include permitting or preventing establishment of the RDMA connection). The policy may be configured to support control over RDMA communications on the RDMA connection between the source RDMA application and the destination RDMA application (e.g., the policy action of the policy may include permitting or preventing forwarding of RDMA data packets on the RDMA connection). For example, a policy can dictate that only RDMA endpoints with attributes X and Y can talk to RDMA endpoints with attribute Z. It will be appreciated that various other zero-trust security policies, based on various other numbers and types of application-level attributes, may be defined and enforced.

The SmartNIC 220 may be configured to support various capabilities which may be leveraged to provide zero-trust authentication for RDMA communications. For example, the SmartNIC 220 may be configured to support an RDMA capability whereby the SmartNIC 220 is able to transfer data directly to other SmartNICs and RDMA packet processing may be fully offloaded to the SmartNICs. For example, the SmartNIC may include programmable central processing unit (CPU) cores that can perform any bump-in-the-wire processing on incoming and outgoing RDMA packets. For example, the SmartNIC may support crypto acceleration using a built-in crypto accelerator that can offload public key cryptography from CPU cores. For example, the SmartNIC may support flow processing offload using a dedicated accelerator which can perform flow processing and switching in hardware ASIC, which can be programmed at run time with the SDN control plane.

The RDMA Engine 221 is a hardware component of the SmartNIC 220 that enables the RDMA applications 211 to run on the end host 210. The RDMA Engine 221 is configured to offload various aspects of RDMA processing from the end host 210. The NIC ports 229 are configured to connect the SmartNIC 220 to a communication network.

The ACU 225 is the central packet processing module within the SmartNIC 220 that enforces zero-trust security policies on RDMA communication. The ACU 225 resides between the RDMA Engine 221 and the NIC ports 229 and, thus, has the ability to inspect incoming/outgoing raw RDMA packets in a bump-in-the-wire fashion. The ACU 225 enforces zero-trust security policies at the beginning of each new incoming/outgoing RDMA connection based on the information provided by Host Tracer 215 and the Policy Agent 227.

The Policy Agent 227 interacts with the Policy Manager 230, via its northbound interface, to receive from the Policy Manager up-to-date zero-trust security policies related to deployed RDMA applications. The Policy Agent 227 maintains a secure communication channel with Policy Manager to retrieve the latest zero-trust security policies for deployed RDMA applications. The communication between the Policy Agent 227 and the Policy Manager 230 is expected to be initiated by Policy Manager 230. For example, the Policy Agent 227, in response to various conditions (e.g., each time a new RDMA application is deployed on the end host 210, when there is a change in deployed policies, or the like), receives from the Policy Manager 230 the zero-trust security policies defined for the RDMA application. The Policy Agent 227 provides the zero-trust security policies to the ACU 225 for use by the ACU 225 to enforce the zero-trust security policies on RDMA communication of the RDMA applications 211 of the end host 210.

The Policy Manager 230 is a centralized policy management facility provisioned in a data center to store zero-trust security policies maintained by the data center operator or tenants for deployed RDMA applications. The Policy Manager 230 maintains a secure communication channel with the Policy Agent 227 to provide the latest zero-trust security policies for deployed RDMA applications. The communication between the Policy Manager 230 and the Policy Agent 227 is expected to be initiated by Policy Manager 230. For example, the Policy Manager 230, in response to various conditions (e.g., each time a new RDMA application is deployed on the end host 210, when there is a change in deployed policies, or the like), pushes to the Policy Agent 227 the zero-trust security policies defined for the RDMA application. The Policy Manager 230 remembers which policies are pushed to the Policy Agent 227.

It will be appreciated that the communication system 200 may include various other modules or elements configured to support enforcement of zero-trust security policies on RDMA communications.

The ACU operating within a SmartNIC, as indicated above, enforces zero-trust security policies on RDMA communications based on associated application-level identities and attributes. In RDMA, in order for two RDMA applications, which also may be referred to as RDMA application endpoints, to communicate with each other, they need to go through a connection establishment step, where they exchange parameters (e.g., QP numbers, Maximum Transmission Unit (MTU) sizes, starting packet sequence numbers, or the like, as well as various combinations thereof) needed to establish RDMA communication. For typical RDMA applications, there are two ways to perform this step: (1) using RDMA Connection Manager (RDMA-CM) or (2)

via a TCP/IP-based out-of-band channel. As discussed further below, the policy enforcement mechanisms applied by the ACU may vary depending on which of the two options is used for connection establishment between the RDMA application endpoints (below, it is initially described for example embodiments using RDMA-CM for connection establishment, and it is then extended for example embodiments using a TCP/IP-based out-of-band channel for connection establishment).

The ACU operating within a SmartNIC, as indicated above, may enforce zero-trust security policies on RDMA communications where RDMA-CM is used to support establishment of the RDMA connection. With RDMA-CM, each RDMA application endpoint in the pair of RDMA application endpoints of the RDMA connection being established discovers the QP number and other parameters of the other RDMA application endpoint in the pair of RDMA application endpoints of the RDMA connection. This discovery process is performed by the RDMA application endpoints by exchanging special types of RDMA packets called ConnectRequest and ConnectReply. With RoCEv2, these packets are encapsulated with IP/UDP headers and mark the beginning of two UDP flows in opposite directions. Subsequent RDMA data packets between the RDMA application endpoints belong to the same bidirectional UDP flows. The ACUs operating within the SmartNICs associated with the RDMA application endpoints may perform policy control on RDMA communications at the time when these ConnectRequest/ConnectReply packets are exchanged among the RDMA application endpoints (i.e., before the RDMA connection is actually established, thereby enabling establishment of the RDMA connection to be prevented). As a result, if the RDMA application endpoints trying to establish an RDMA connection are not allowed to talk to each other over RDMA per an associated zero-trust security policy, the ACUs of the SmartNICs associated with the endpoints may block establishment of the RDMA connection by blocking the initial exchange of the ConnectRequest and ConnectReply packets between the RDMA application endpoints.

The ACU, based on support for controlling establishment of the RDMA connection by controlling the initial exchange of the ConnectRequest and ConnectReply packets between the RDMA application endpoints, may be implemented on top of an Open vSwitch (OVS)-based software switch. For flexible and efficient flow rule processing, the forwarding data plane of OVS consists of two distinct datapaths: slow path and fast path. The first packet of each new microflow goes through the slow path, during which the highest-priority matching rule for the new flow is identified and cached. Any subsequent packets that belong to the same flow are processed by the cached rule in the fast path. When OVS is deployed in a SmartNIC, its slow path is executed by on-board CPU cores, while its fast path flow processing is handled by the OVS offload ASIC. As such, policy enforcement of the ACU may be implemented as part of OVS slow path processing, where the first packets of bidirectional RDMA communication (i.e., ConnectRequest and ConnectReply) go through policy control. However, since policy control is based on application-level attributes which are not visible from the packets themselves, the ACU relies on tagging the packets. That is, the ACU on the source side attaches a special tag to outgoing packets where the tag represents the application-level attributes of the source RDMA application on the source side, while the ACU on the destination side extracts the application-level attributes of the source RDMA application from the tag, determines the application-level attributes of the destination RDMA application on the destination side, and performs policy control based on the application-level attributes of the source RDMA application and the application-level attributes of the destination RDMA application.

The ACU, in order to support control over establishment of the RDMA connection by controlling the initial exchange of the ConnectRequest and ConnectReply packets between the RDMA application endpoints, may support various capabilities. For example, the ACU may maintain two table for use in controlling establishment of RDMA connections: an identity table and a policy table. The identity table stores <PID, GID, QPN, A> tuples (e.g., discovered by a Host Tracer such as Host Tracer 215). In the identity table, either <PID> or <GID, QPN> is used as a key into table to identify a set of associated application-level attributes (A) which are maintained as the corresponding values. The policy table maintains <$A_{src}$, $A_{dst}$, Action> tuples (e.g., sent by a Policy Agent such as Policy Agent 227). In the policy table, a combination of the application-level attributes of the source RDMA application ($A_{src}$) and the application-level attributes of the destination RDMA application (A dst) is used as a key into the table to identify the associated policy action (Action) to be performed The ACU, in order to ensure the authentication and secrecy of tag content during network transmission may rely on various authentication and encryption capabilities. For example, the ACU, in order to ensure authentication and secrecy of tag content during network transmission, may rely on OpenPGP-like cryptographic protection (e.g., the SmartNICs may utilize various private and public key pairs). It will be appreciated that at least some of the cryptographic operations may be offloaded to a crypto accelerator of the SmartNIC. It will be appreciated, as indicated above and discussed further below, that the ACU may support various other capabilities for supporting control over establishment of the RDMA connection by controlling the initial exchange of the ConnectRequest and ConnectReply packets between the RDMA application endpoints.

The source SmartNIC associated with the end host hosting the source RDMA application that sends the Connect packet is configured to perform egress packet processing for providing zero-trust authentication. When a Connect message (e.g., a ConnectRequest or ConnectReply packet) generated by an RDMA application enters the OVS in the source SmartNIC, on its way out of a local host, the Connect message triggers slow path processing in the OVS, during which the ACU generates a tag and attaches it to the Connect message to form a Connect packet. For tag generation, the ACU of the source SmartNIC relies on the identity table. For example, the ACU of the source SmartNIC may extract the GID (e.g., the source IP address of IP header) and the QPN (e.g., the Local QP number in the ConnectRequest/ConnectReply payload) from the Connection message and perform a lookup in the identity table based on the combination of the GID and the QPN to find the associated application-level attributes of the source $A_{src}$, which includes one or more application-level attributes of the source RDMA application on the source end host which generated the Connect message. To prevent tampering on the application-level attributes of the source $A_{src}$ by a malicious actor, the application-level attributes of the source $A_{src}$ are signed using the local private key of the source SmartNIC. The application-level attributes of the source $A_{src}$ may be pre-signed before being stored in the identity table such that the application-level attributes of the source $A_{src}$ are already signed when retrieved from the identity table by the ACU of the source SmartNIC, or the application-level attributes of the source $A_{src}$ may be stored in the identity table unsigned and may then be signed by the ACU of the source SmartNIC after being retrieved from the identity table by the ACU of the source SmartNIC. The ACU of the source SmartNIC generates a one-time secret key for symmetric encryption and encrypts the signed application-level attributes of the source $A_{src}$ with the secret key. This encryption preserves the confidentiality of the tag. The ACU of the source SmartNIC then encrypts the secret key using the public key of the destination SmartNIC associated with the end host that hosts the destination RDMA application for which the Connect packet is intended. This ensures that only the destination SmartNIC can decrypt the encrypted application-level attributes of the source $A_{src}$. The public key of the destination SmartNIC can be looked up with the destination IP address in the Connect packet, and then cached in the source SmartNIC for subsequent reuse. The encrypted application-level attributes of the source $A_{src}$ and the encrypted secret key form a tag which is attached by the ACU of the source SmartNIC to the Connect message to form a Connect packet, which is then sent toward the destination side. The size of the Connect message (e.g., 322 bytes for RoCEv2 over IPv4) is well below typical RDMA MTU size and, thus, appending the tag to the Connect message will not cause the size of the resulting Connect packet to exceed the RDMA MTU size. It will be appreciated that the egress packet processing by the source SmartNIC may be further understood by way of reference to the method flow of FIG. 3.

Figure 3:
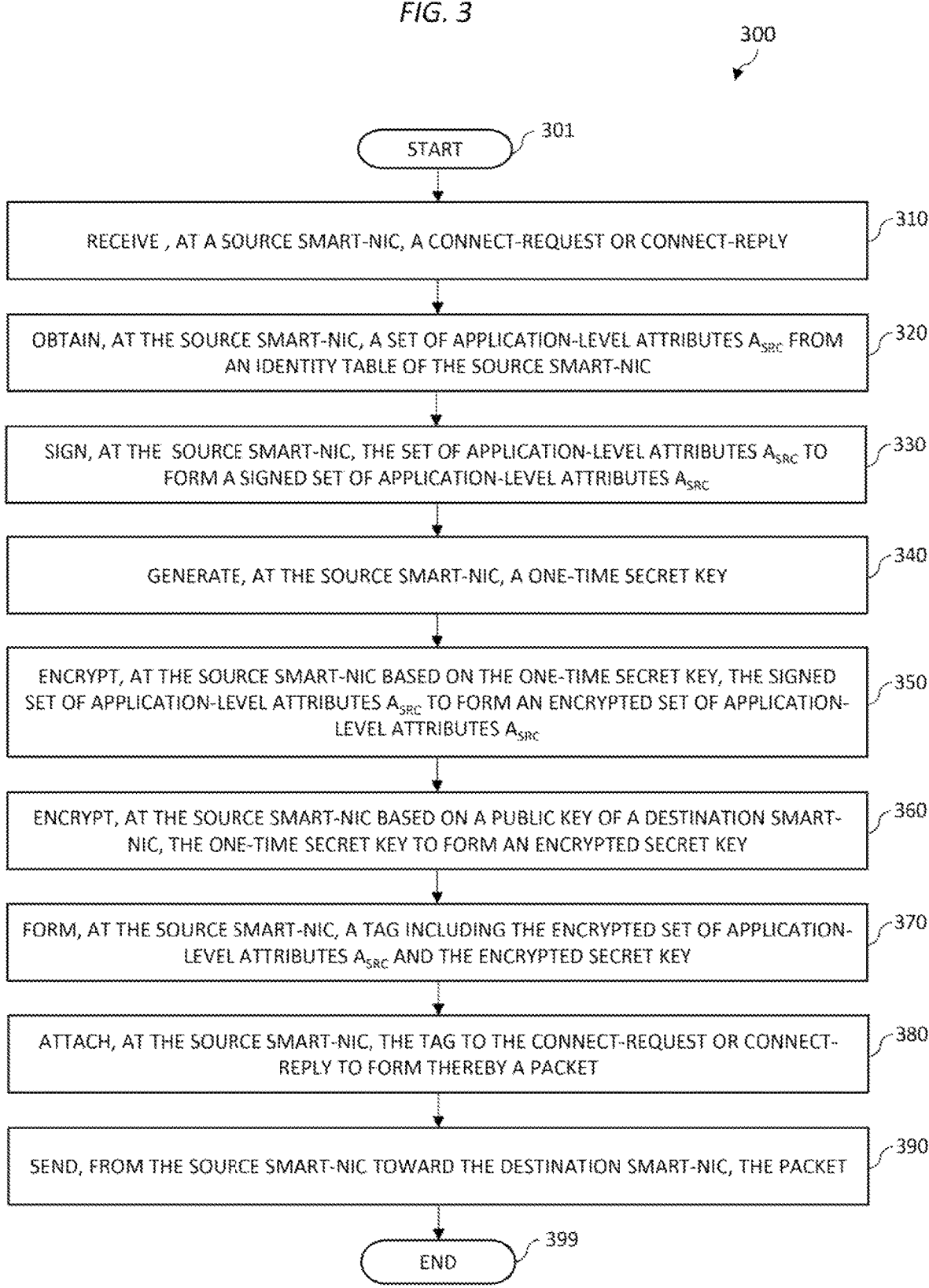
FIG. 3 depicts an example embodiment of a method for use by an access control unit of a network interface card for egress packet processing for a connection message packet generated by an RDMA application.

FIG. 3 depicts an example embodiment of a method for use by an access control unit of a network interface card for egress packet processing for a connection message packet generated by an RDMA application. It will be appreciated that, although primarily presented as being performed serially, at least a portion of the functions of method 300 may be performed contemporaneously or in a different order than as presented in FIG. 3. It will be appreciated that the method 300 is execute by a source SmartNIC associated with an end host hosting a source RDMA application. At block 310, receive, at the source SmartNIC, a ConnectRequest or ConnectReply. The ConnectRequest or ConnectReply is received from the source RDMA application on the end host associated with the source SmartNIC and is intended for a destination RDMA application on an end host associated with a destination SmartNIC. At block 320, obtain, at the source SmartNIC, a set of application-level attributes $A_{src}$ from an identity table of the source SmartNIC. The set of application-level attributes $A_{src}$ includes one or more application-level attributes of the source RDMA application. At block 330, sign, at the source SmartNIC, the set of application-level attributes $A_{src}$ to form a signed set of application-level attributes $A_{src}$. It will be appreciated that block 330 may be omitted where the set of application-level attributes $A_{src}$ is stored in the identity table in pre-signed form. At block 340, generate, at the source SmartNIC, a one-time secret key. At block 350, encrypt, at the source SmartNIC based on the one-time secret key, the signed set of application-level attributes $A_{src}$ to form an encrypted set of application-level attributes $A_{src}$. At block 360, encrypt, at the source SmartNIC based on a public key of the destination SmartNIC, the one-time secret key form an encrypted secret key. At block 370, form, at the source SmartNIC, a tag including the encrypted set of application-level attributes $A_{src}$ and the encrypted secret key. At block 380, attach, at the source SmartNIC, the tag to the ConnectRequest or ConnectReply to form thereby a packet. At block 390, send, from the source SmartNIC toward the destination SmartNIC, the packet. At block 399, the method 300 ends.

The destination SmartNIC associated with the end host hosting the destination RDMA application that receives the Connect packet is configured to perform ingress packet processing for providing zero-trust authentication. When a Connect packet (e.g., a ConnectRequest packet including a ConnectRequest message or a ConnectReply packet including a ConnectReply message) is received and enters the OVS in the destination SmartNIC on its way into the destination-side end host, the Connect packet triggers slow path processing in the OVS of the destination SmartNIC.

The first step of the slow path processing by the ACU of the destination SmartNIC is to identify the set of application-level attributes of the destination $A_{dst}$, which includes one or more application-level attributes of the destination RDMA application on the destination end host for which the Connection message of the Connect packet is intended, so that the ACU can apply appropriate policies. The manner in which the ACU determines the set of application-level attributes of the destination $A_{dst}$ depends on whether the incoming Connect packet includes a ConnectRequest message or a ConnectReply message.

For ConnectRequest packets, the ACU leverages the "Destination Port" field in ConnectRequest payload to determine the set of application-level attributes of the destination $A_{dst}$. This port corresponds to the port allocated by a recipient application to bind its RDMA service to a specific port for service discovery (e.g., via rdma_bind_addr( ) API). Therefore, from this port information, the ACU can determine the application PID to which a given ConnectRequest packet is intended and may then use that application PID to perform a lookup in the identity table and obtain the corresponding set of application-level attributes of the destination $A_{dst}$.

For ConnectReply packets, the ACU exploits the fact that the "Remote Communication ID" field of any ConnectReply packet should be identical to the "Local Communication ID" field of a corresponding ConnectRequest packet. More specifically, the ACU remembers the "Local Communication ID" of each outgoing ConnectRequest packet and its associated attributes $A_{src}$ detected as part of egress processing. Then, when the ACU sees an incoming ConnectReply packet, it uses the "Remote Communication ID" of the incoming ConnectReply packet to look up its set of application-level attributes of the destination $A_{dst}$ based on the previously remembered ConnectRequest information.

The next step of the slow path processing by the ACU of the destination SmartNIC is to perform tag processing on the tag of the received Connect packet. The ACU of the destination SmartNIC extracts, from the tag of the received Connect packet, the encrypted application-level attributes of the source $A_{src}$ and the encrypted secret key. The ACU of the destination SmartNIC decrypts the encrypted secret key, using the private key of the destination SmartNIC, to recover the one-time secret key. The ACU of the destination SmartNIC then decrypts the encrypted application-level attributes of the source $A_{src}$ based on the one-time secret key to recover the signed application-level attributes of the source $A_{src}$. The ACU of the destination SmartNIC obtains the public key of the source SmartNIC and uses the public key of the source SmartNIC to verify the decrypted application-level attributes of the source $A_{src}$ to provide for authenticity of the application-level attributes of the source $A_{src}$. The ACU of the destination SmartNIC may obtain the public key of the source SmartNIC based on a lookup using the source IP address of the Connect packet, and the ACU of the destination SmartNIC may cache the public key of the source SmartNIC for subsequent reuse.

The next step of the slow path processing by the ACU of the destination SmartNIC is to perform zero-trust policy enforcement for the connection between the source RDMA application on the source end host and the destination RDMA application on the destination end host. The ACU of the destination SmartNIC determines the zero-trust policy to be enforced based on a combination of the application-level attributes of the source $A_{src}$ and the application-level attributes of the destination $A_{dst}$. The ACU of the destination SmartNIC may determine the zero-trust policy to be enforced based on use of a combination of the application-level attributes of the source $A_{src}$ and the application-level attributes of the destination $A_{dst}$ to perform a lookup in a policy table to identify the zero-trust policy to be enforced.

It is noted that, after policy enforcement on the RDMA connection is completed, the destination SmartNIC may be configured to apply one or more policy actions to RDMA data packets sent on the RDMA connection (e.g., the ACU on the destination SmartNIC may configure a flow processing accelerator of the destination SmartNIC such that the flow processing accelerator can apply one or more policy actions to RDMA data packets sent on the RDMA connection), thereby enabling control over the RDMA connection at the RDMA data packet level.

Figure 4:
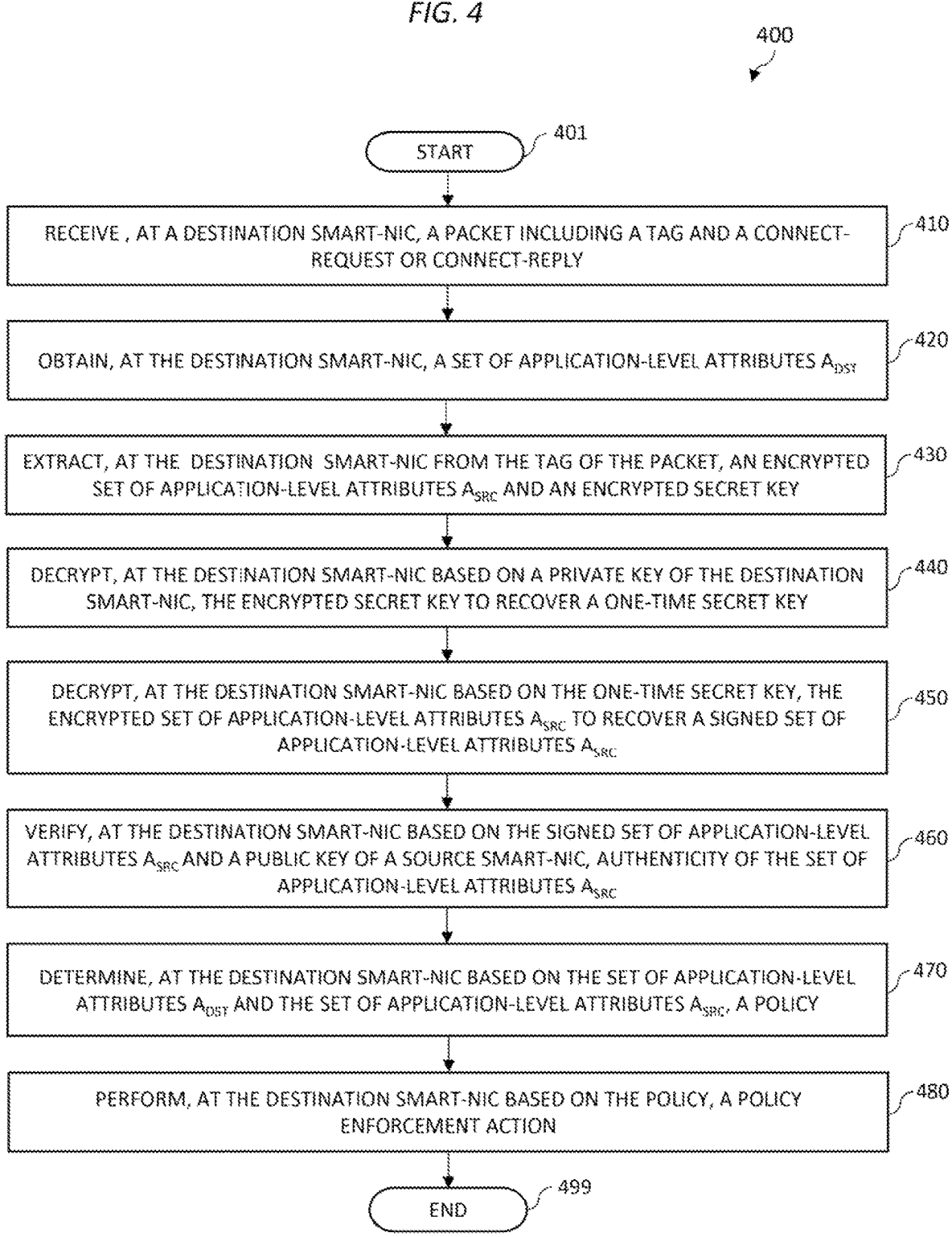
FIG. 4 depicts an example embodiment of a method for use by an access control unit of a network interface card for ingress packet processing for a connection message packet intended for an RDMA application.

It will be appreciated that the egress packet processing by the source SmartNIC may be further understood by way of reference to the method flow of FIG. 4.

FIG. 4 depicts an example embodiment of a method for use by an access control unit of a network interface card for ingress packet processing for a connection message packet intended for an RDMA application. It will be appreciated that, although primarily presented as being performed serially, at least a portion of the functions of method 400 may be performed contemporaneously or in a different order than as presented in FIG. 4. At block 401, the method 400 begins. At block 410, receive, at the destination SmartNIC, a packet including a tag and a ConnectRequest or ConnectReply. The ConnectRequest or ConnectReply is intended for a destination RDMA application on an end host associated with the destination SmartNIC and is received from the source RDMA application on an end host associated with a source SmartNIC. The tag includes an encrypted set of application-level attributes $A_{src}$ of the source RDMA application and an encrypted secret key. At block 420, obtain, at the destination SmartNIC, a set of application-level attributes $A_{dst}$ of the destination RDMA application. The set of application-level attributes $A_{dst}$ includes one or more application-level attributes of the destination RDMA application. At block 430, extract, by the destination Smart-NIC from the tag of the packet, the encrypted set of application-level attributes $A_{src}$ of the source RDMA application and the encrypted secret key. At block 440, decrypt, at the destination SmartNIC based on a private key of the destination SmartNIC, the encrypted secret key to recover the one-time secret key. At block 450, decrypt, at the destination SmartNIC based on the one-time secret key, the encrypted set of application-level attributes $A_{src}$ of the source RDMA application to recover a signed set of application-level attributes $A_{src}$ of the source RDMA application. At block 460, verify, at the destination SmartNIC based on the signed set of application-level attributes $A_{src}$ of the source RDMA application and a public key of the source SmartNIC, authenticity of the set of application-level attributes $A_{src}$ of the source RDMA application. At block 470, determine, at the destination SmartNIC based on the set of application-level attributes $A_{dst}$ of the destination RDMA application and the set of application-level attributes $A_{src}$ of the source RDMA application, a policy. At block 480, perform, at the destination SmartNIC based on the policy, a policy enforcement action. At block 499, the method 400 ends.

It will be appreciated that, although primarily presented herein with respect to example embodiments in which the zero-trust authentication capabilities between the end hosts hosting RDMA applications are provided where the RDMA applications use RDMA-CA to establish RDMA communication, in at least some example embodiments the RDMA applications may use other mechanisms to establish RDMA communication. For example, the RDMA applications may use out-of-band channels, such as out-of-band channels based on Transmission Control Protocol (TCP)/Internet Protocol (IP), to exchange information needed to establish RDMA sessions between the RDMA applications.

The ACU, when an out-of-band communication channel is used to establish RDMA communication, may need to determine the source-side application-level attributes $A_{src}$ and the destination-side application-level attributes $A_{dst}$ based on a regular RDMA data packet sent over the RDMA connection after the RDMA connection has been established (e.g., based on the initial RDMA data packet exchanged over the RDMA connection after the RDMA connection has been established using the out-of-band channel), as opposed to based on RDMA Connect packets (e.g., based on ConnectRequest and ConnectReply packets sent based on RDMA-CM). This is because such an out-of-band communication channel may not be able to be interpreted by the ACU as it may be custom-built by individual RDMA applications. It is noted that, here, once the source-side application-level attributes $A_{src}$ and the destination-side application-level attributes $A_{dst}$ are determined, the remainder of the tag processing may be the same as in the RDMA-CM case. It is noted that, after policy enforcement on the RDMA data packet is completed, the destination SmartNIC may be configured to apply the same policy action to subsequent RDMA data packets on the same RDMA connection (e.g., the ACU on the destination SmartNIC may configure a flow processing accelerator of the SmartNIC such that the flow processing accelerator of the destination SmartNIC can apply the same policy action to subsequent RDMA data packets on the same RDMA connection), thereby enabling control over the RDMA connection at the RDMA data packet level.

Figures 5, 6:
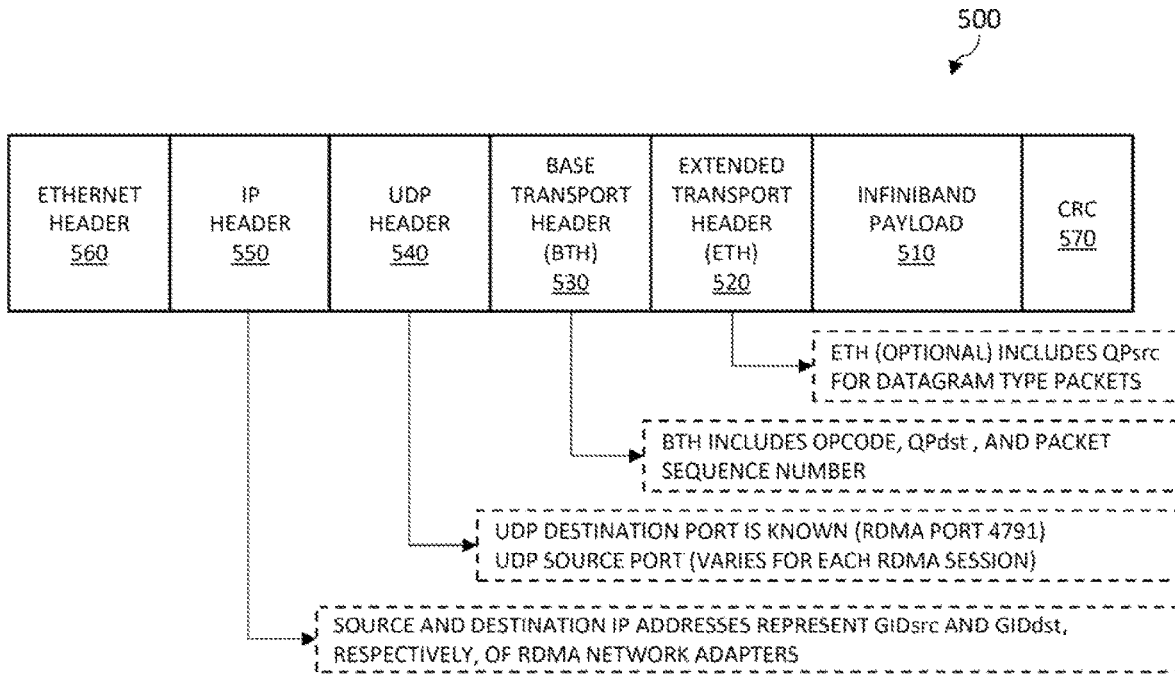
FIG. 5 depicts an example embodiment of a format of an RDMA packet which may be processed in conjunction with supporting zero-trust authentication capabilities.
FIG. 6 depicts an example embodiment of an algorithm for determining a set of application-level attributes of a source RDMA application for an outgoing connection message.

The RDMA protocol defines multiple fixed-sized MTUs (e.g., 256 bytes, 512 bytes, 1024 bytes, 2048 bytes, or 4096 bytes), and the RoCE MTU is set to be smaller than the Ethernet MTU. With the default Ethernet MTU of 1500 bytes, the RoCE MTU is set to 1024 bytes. As such, the size of an RDMA data packet combined with a tag will not exceed an Ethernet MTU. The format of an RoCEv2 packet is depicted in FIG. 5. As illustrated in FIG. 5, the RoCEv2 packet 500 includes an Infiniband payload 510, an Extended Transport Header (ETH) 520, a Base Transport Header (BTH) 530, a UDP Header 540, an IP Header 550, an Ethernet Header 560, and a CRC 570. The Extended Transport Header 520 is an optional header and includes $QP_{src}$ for Datagram packet type. The Base Transport Header 530 includes OpCode, $QP_{dst}$, and Packet Sequence Number. The UDP Header 540 includes a UDP Destination Port which is a set value for RDMA (e.g., 4791 for RDMA) and a UDP Source Port which varies for each RDMA session. The IP Header 550 includes a Source IP Address (which represents the $GID_{src}$ of the RDMA network adapter) and a Destination IP Address (which represents the $GID_{dst}$ of the RDMA network adapter).

The manner in which the ACU discovers the source-side application-level attributes $A_{src}$ of the source RDMA application (for an outgoing data packet) and the destination-side application-level attributes $A_{dst}$ of the destination RDMA application (for an incoming data packet) is discussed further below.

The ACU, during egress packet processing, may discover the application-level attributes $A_{src}$ of the source RDMA application associated with an outgoing RDMA data packet from the RDMA data packet by leveraging the fact that UDP-Port carried by RoCEv2-based RDMA packets is determined solely based on $QP_{src}$ and $QP_{dst}$ when RDMA-CM is not used. That is UDP-Port$_{src}$=(QP$_{src}$[0 . . . 15] XOR QP$_{dst}$[0 . . . 15]) OR 0xC000. In addition, an RDMA data packet carries $QP_{dst}$ information in its Base Transport Header (BTH). The ACU may exploit this knowledge to determine the application-level attributes $A_{src}$ of the source RDMA application of an outgoing RDMA data packet using the algorithm depicted in FIG. 6.

FIG. 6 depicts an example embodiment of an algorithm for determining a set of application-level attributes of a source RDMA application for an outgoing connection message. The algorithm 600, as indicated above, is configured to determine the application-level attributes $A_{src}$ of the source RDMA application of an outgoing RDMA data packet. The inputs to the algorithm 600 include the <GID$_{src}$, GID$_{dst}$, QP$_{dst}$, UDP-Port$_{src}$> extracted from the RDMA data packet and <GID, QP, A> tuples from the identity table. The output of the algorithm 600 is the application-level attributes $A_{src}$ of the source RDMA application of an outgoing RDMA data packet. In the algorithm 600, for each <QP, A> with GID$_{src}$, port=(QP[0 . . . 15] XOR QP$_{dst}$[0 . . . 15]) OR 0xC000 and, if port==UDP-Port$_{src}$, then A is returned as the application-level attributes $A_{src}$ of the source RDMA application of an outgoing RDMA data packet.

The ACU, during ingress packet processing, may discover the application-level attributes $A_{dst}$ of the destination RDMA application associated with an incoming RDMA data packet from the RDMA data packet. The ACU may discover the application-level attributes $A_{dst}$ of the destination RDMA application associated with an incoming RDMA data packet from the RDMA data packet, because the RDMA data packet itself carries $QP_{dst}$ in its BTH. Thus, the ACU may simply extract GID$_{dst}$ and QP$_{dst}$ from the RDMA data packet and perform a lookup in the identity table, using <GID$_{dst}$, QP$_{dst}$> as a key, to obtain the application-level attributes $A_{dst}$ of the destination RDMA application.

It will be appreciated that, although primarily presented herein with respect to example embodiments in which the zero-trust authentication capabilities between the end hosts hosting RDMA applications are provided by SmartNICs associated with the end hosts (e.g., where the end hosts on which the RDMA applications are deployed are equipped with SmartNICs supporting zero-trust authentication capabilities), in at least some example embodiments the zero-trust authentication capabilities on the source side and/or on the destination side may be provided at one or more other locations/devices along the path between the end hosts hosting. For example, in a data center network, the zero-trust authentication capabilities primarily presented as being provided on the SmartNICs of the end hosts may be provided on the Top-of-Rack switches to which the end hosts are connected. For example, in a communication network, the zero-trust authentication capabilities primarily presented as being provided on the SmartNICs of the end hosts may be provided on edge routers of the communication network via which the end hosts access the communication network. For example, the zero-trust authentication capabilities primarily presented as being provided on the SmartNICs of the end hosts may be provided on various types of devices having sufficient programmability to support the ACU slow-path processing and to support communication with the Host Tracer and the Policy Manager via secure channels. It will be appreciated that offloading the zero-trust authentication capabilities from the SmartNICs may obviate the need for use of SmartNICs in the end hosts (e.g., non-programmable RNICs may be used by the end hosts). It will be appreciated that the zero-trust authentication capabilities on the source side and/or on the destination side may be provided at various other combinations of locations/devices along the path between the end hosts hosting the RDMA applications.

Figure 7:
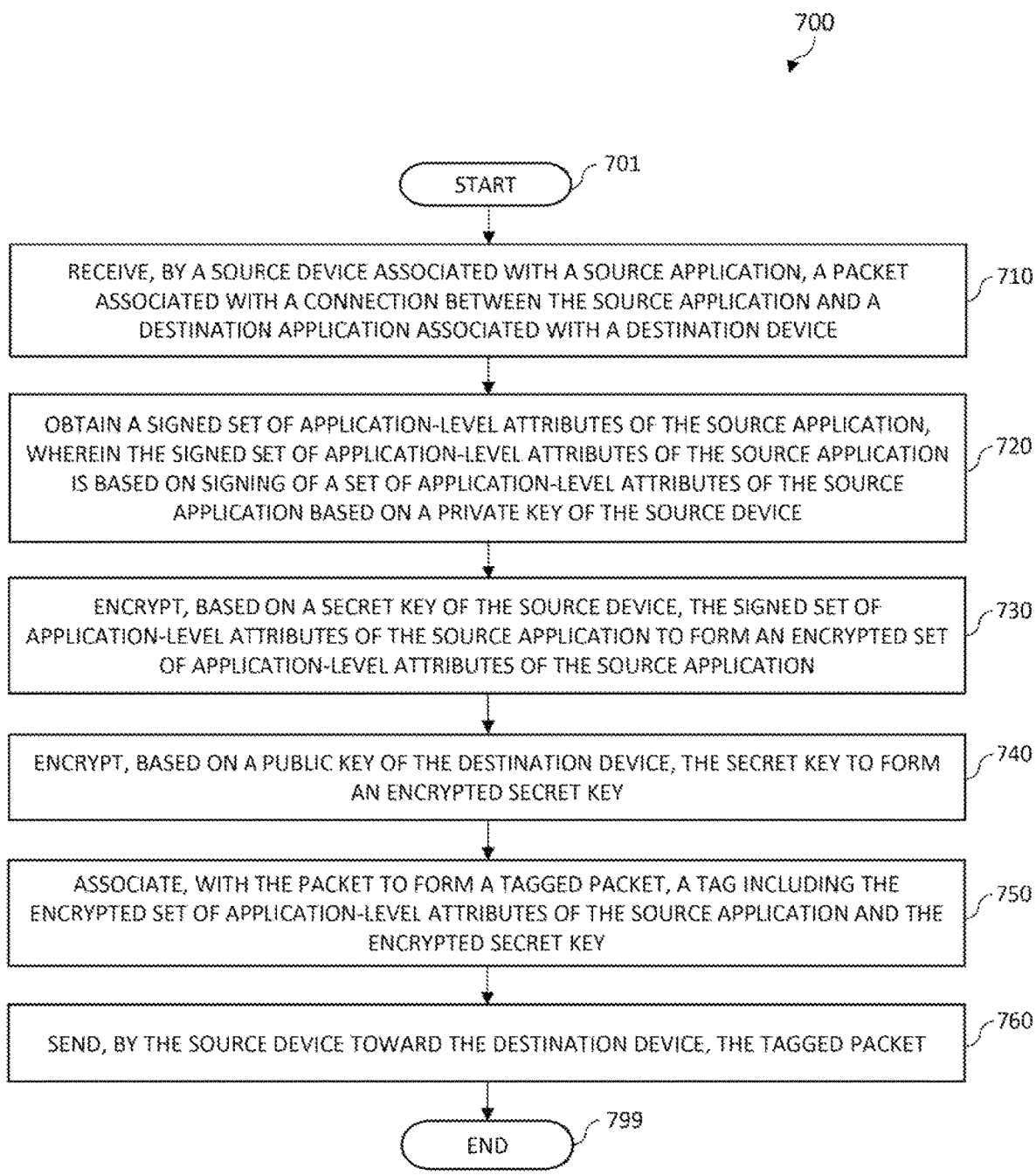
FIG. 7 depicts an example embodiment of a method for use by a device associated with a source RDMA application of an RDMA connection for supporting zero-trust authentication capabilities.

FIG. 7 depicts an example embodiment of a method for use by a device associated with a source RDMA application of an RDMA connection for supporting zero-trust authentication capabilities. It will be appreciated that, although primarily presented herein as being performed serially, at least a portion of the functions of method 700 may be performed contemporaneously or in a different order than as presented in FIG. 7. At block 701, the method 700 begins. At block 710, receive, by a source device associated with a source application, a packet associated with a connection between the source application and a destination application associated with a destination device. At block 720, obtain a signed set of application-level attributes of the source application, wherein the signed set of application-level attributes of the source application is based on signing of a set of application-level attributes of the source application based on a private key of the source device. At block 730, encrypt, based on a secret key of the source device, the signed set of application-level attributes of the source application to form an encrypted set of application-level attributes of the source application. At block 740, encrypt, based on a public key of the destination device, the secret key to form an encrypted secret key. At block 750, associate, with the packet to form a tagged packet, a tag including the encrypted set of application-level attributes of the source application and the encrypted secret key. At block 760, send, by the source device toward the destination device, the tagged packet. At block 799, the method 700 ends.

Figure 8:
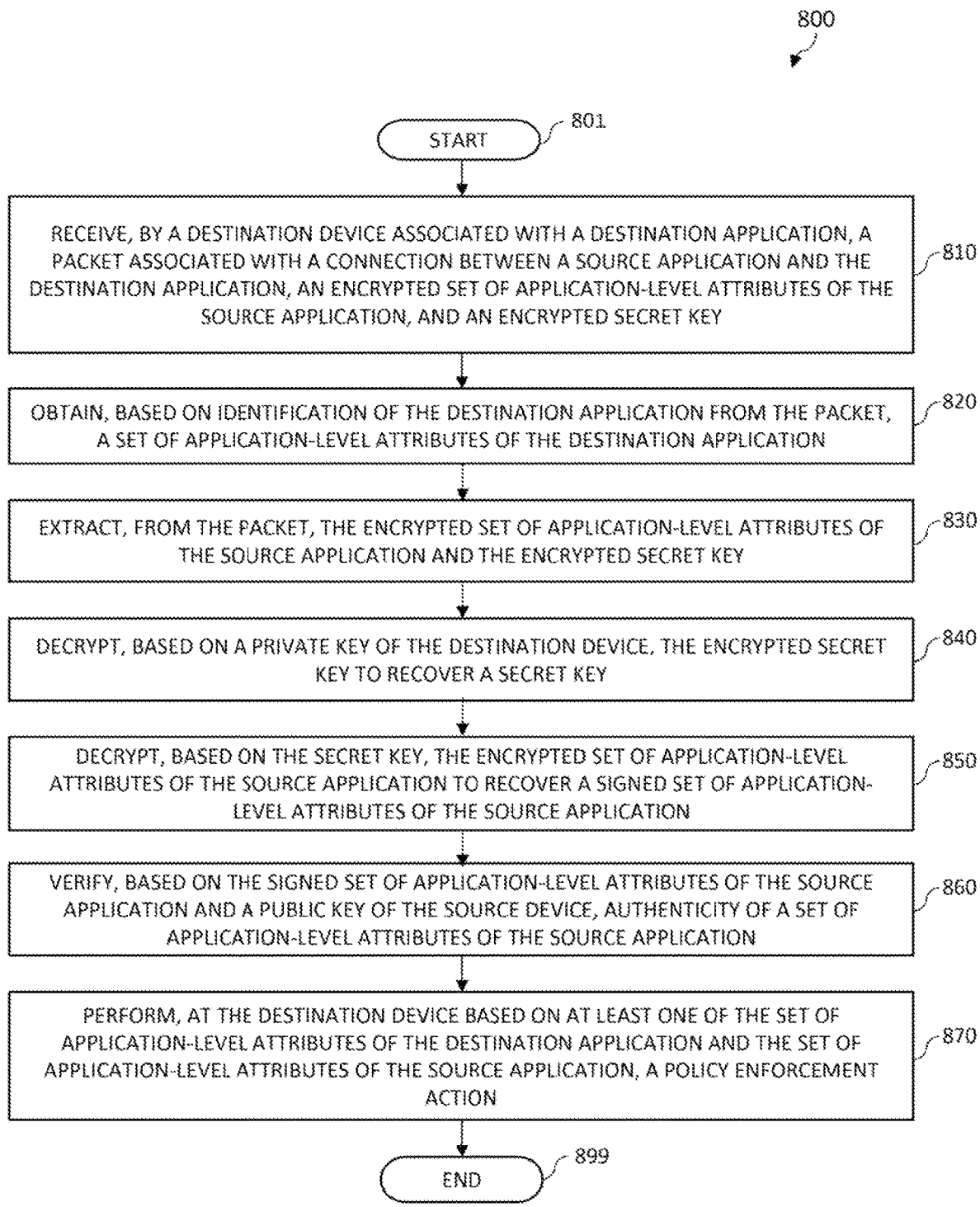
FIG. 8 depicts an example embodiment of a method for use by a device associated with a destination RDMA application of an RDMA connection for supporting zero-trust authentication capabilities.

FIG. 8 depicts an example embodiment of a method for use by a device associated with a destination RDMA application of an RDMA connection for supporting zero-trust authentication capabilities. It will be appreciated that, although primarily presented herein as being performed serially, at least a portion of the functions of method 800 may be performed contemporaneously or in a different order than as presented in FIG. 8. At block 801, the method 800 begins. At block 810, receive, by a destination device associated with a destination application, a packet associated with a connection between a source application and the destination application, an encrypted set of application-level attributes of the source application, and an encrypted secret key. At block 820, obtain, based on identification of the destination application from the packet, a set of application-level attributes of the destination application. At block 830, extract, from the packet, the encrypted set of application-level attributes of the source application and the encrypted secret key. At block 840, decrypt, based on a private key of the destination device, the encrypted secret key to recover a secret key. At block 850, decrypt, based on the secret key, the encrypted set of application-level attributes of the source application to recover a signed set of application-level attributes of the source application. At block 860, verify, based on the signed set of application-level attributes of the source application and a public key of the source device, authenticity of the set of application-level attributes of the source application. At block 870, perform, at the destination device based on at least one of the set of application-level attributes of the destination application and the set of application-level attributes of the source application, a policy enforcement action. At block 899, the method 800 ends.

Figure 9:
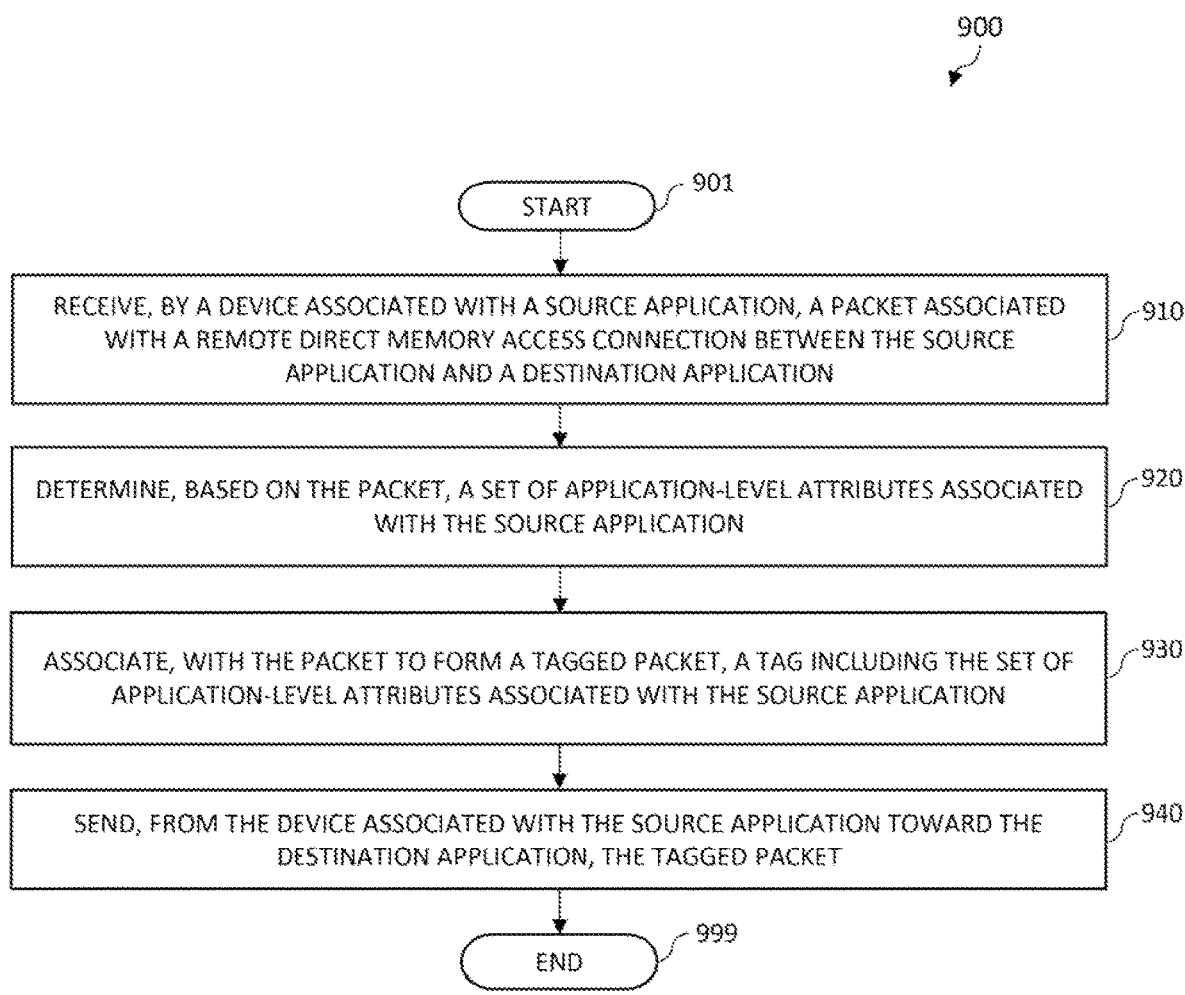
FIG. 9 depicts an example embodiment of a method for use by a device associated with a source RDMA application of an RDMA connection for supporting zero-trust authentication capabilities.

FIG. 9 depicts an example embodiment of a method for use by a device associated with a source RDMA application of An RDMA connection for supporting zero-trust authentication capabilities. It will be appreciated that, although primarily presented herein as being performed serially, at least a portion of the functions of method 900 may be performed contemporaneously or in a different order than as presented in FIG. 9. At block 901, the method 900 begins. At block 910, receive, by a device associated with a source application, a packet associated with a remote direct memory access connection between the source application and a destination application. At block 920, determine, based on the packet, a set of application-level attributes associated with the source application. At block 930, associate, with the packet to form a tagged packet, a tag including the set of application-level attributes associated with the source application. At block 940, send, from the device associated with the source application toward the destination application, the tagged packet. At block 999, the method 900 ends.

Figure 10:
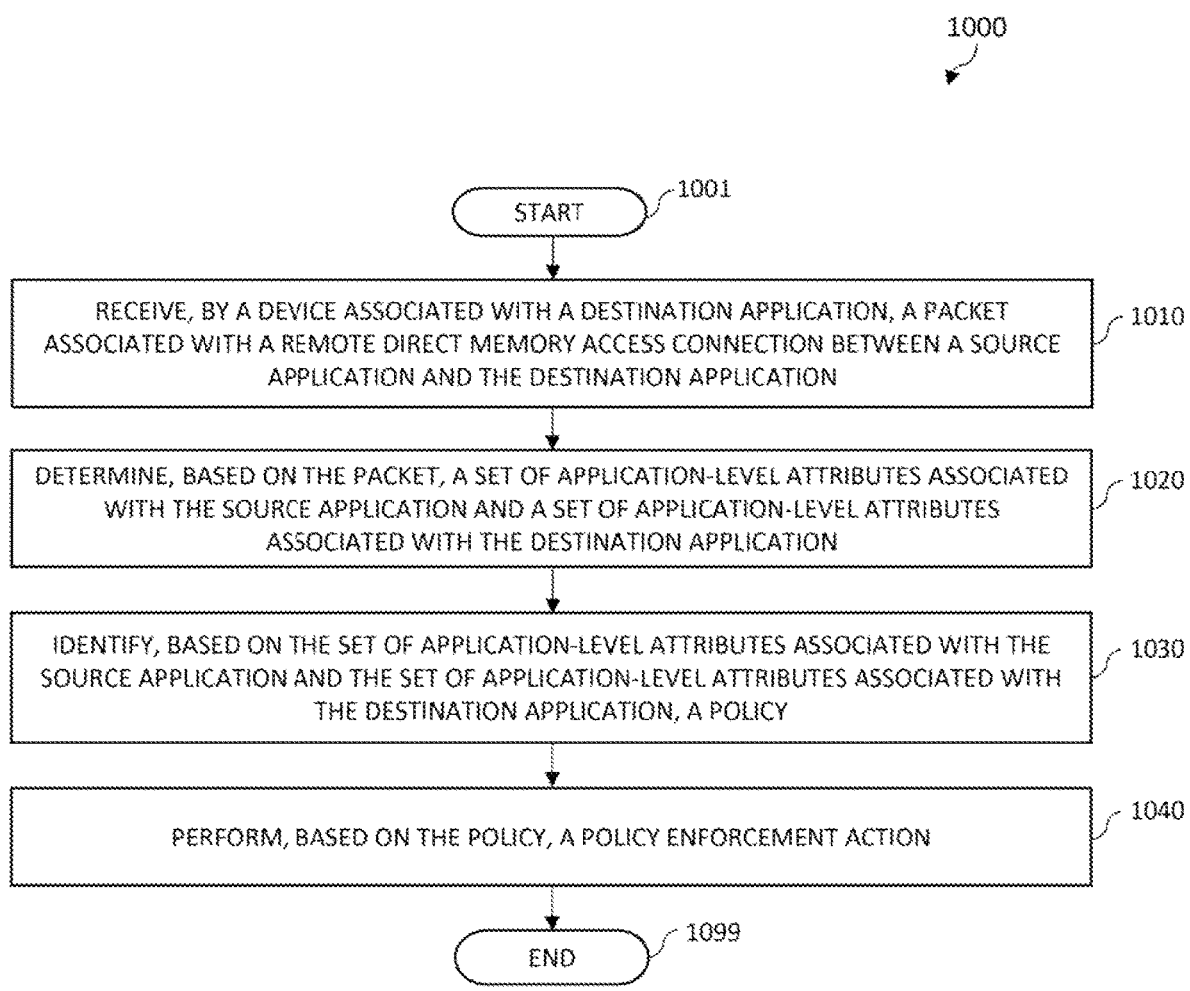
FIG. 10 depicts an example embodiment of a method for use by a device associated with a destination RDMA application of an RDMA connection for supporting zero-trust authentication capabilities.

FIG. 10 depicts an example embodiment of a method for use by a device associated with a destination RDMA application of an RDMA connection for supporting zero-trust authentication capabilities. It will be appreciated that, although primarily presented herein as being performed serially, at least a portion of the functions of method 1000 may be performed contemporaneously or in a different order than as presented in FIG. 10. At block 1001, the method 1000 begins. At block 1010, receive, by a device associated with a destination application, a packet associated with a remote direct memory access connection between a source application and the destination application. At block 1020, determine, based on the packet, a set of application-level attributes associated with the source application and a set of application-level attributes associated with the destination application. At block 1030, identify, based on the set of application-level attributes associated with the source application and the set of application-level attributes associated with the destination application, a policy. At block 1040, perform, based on the policy, a policy enforcement action. At block 1099, the method 1000 ends.

It will be appreciated that, although primarily presented within the context of supporting zero-trust authentication for an RDMA connection between a source RDMA application and a destination RDMA application where the source RDMA application and the destination RDMA application are depicted as being the endpoints of end-to-end communication, zero-trust authentication may be provided for an RDMA connection between a source RDMA application and a destination RDMA application where the source RDMA application and the destination RDMA application, although operating as the RDMA application endpoints (or at least potential RDMA application endpoints) for the RDMA connection, may not be the endpoints of an end-to-communication path which utilizes the RDMA connection (e.g., the RDMA connection may form part of an end-to-end path such that the source RDMA application and/or the destination RDMA application may be intermediaries of a larger path.

Various example embodiments for supporting zero-trust authentication for RDMA communications may be configured to provide various advantages or potential advantages. For example, various example embodiments for supporting zero-trust authentication for RDMA communications may be configured to enforces zero-trust security policies on RDMA traffic in a network-independent manner as the zero-trust security policies are defined based on application-level identities and attributes. This significantly reduces the complexity and overhead in policy management and enforcement, since the number of rules to install and update does not increase with the number of deployed application instances, but scales with the number of application types. For example, various example embodiments for supporting zero-trust authentication for RDMA communications may be configured to provide zero-trust policy enforcement within a SmartNIC such that the zero-trust policy enforcement is completely transparent to RDMA applications and the RDMA software stack on the end hosts. As a result, there is no need for any modification or recompilation of existing RDMA applications and there is no need to redeploy RDMA applications when changing zero-trust security policies for RDMA applications that are already running. For example, various example embodiments for supporting zero-trust authentication for RDMA communications may be configured to achieve zero-trust authentication in RDMA without any changes in fixed logic of existing RDMA Network Interface Card (RNIC) hardware (e.g., RDMA Engine 221 in FIG. 2), as policy enforcement occurs closest on wire after RDMA packets are generated within the RDMA hardware engine. For example, various example embodiments for supporting zero-trust authentication for RDMA communications may be configured to achieve zero-trust authentication in RDMA without requiring use of InfiniBand partitions. InfiniBand networks provide a hardware-based security isolation mechanism called partitioning. InfiniBand partitioning defines resource group membership for RDMA NIC ports or switch ports, which is centrally managed via a Subnet Management of an InfiniBand Fabric Manager. Similar to VLANs, partitions are configured in each port of InfiniBand switches or RDMA nodes, creating virtual fabrics. Then, only RDMA endpoints created within the same partition can communicate with one another. InfiniBand partitions are statically configured, coarse-grained port-level access control, and generally fail to provide application-dependent, granular zero-trust policies. In addition, RoCE deployments generally are unable to leverage InfiniBand partitions. For example, various example embodiments for supporting zero-trust authentication for RDMA communications may be configured to achieve zero-trust authentication in RDMA without requiring use of RDMA over IP Security (IPSec). With RoCEv2, which operates over IP, plaintext RDMA packets can be protected via IPsec tunnels created at the IP layer. Since RDMA packets are generated via RNIC hardware, IPSec processing (i.e., packet encryption/decryption and encapsulation/decapsulation) generally needs to be performed within the same RNIC hardware for end-to-end security. Similar to InfiniBand partitions, this makes RDMA over IPsec a hardware-based security solution requiring support from RDMA NIC vendors. In terms of security benefits, IPsec primarily focuses on preserving secrecy and integrity in underlying packets; however, in the context of zero-trust security, IPsec policies are considered coarse-grained, network-endpoint-based access control, but lacking any application-level context. Therefore, in order to support fine-grained, application-dependent zero-trust policies, the IPsec policy infrastructure would have to be adapted to handle complex translation between network endpoints and application contexts, and hence suffer from similar management complexities as in network-based segmentation.

It will be appreciated that various example embodiments for supporting zero-trust authentication for RDMA communications may be configured to provide various other advantages or potential advantages.

Figure 11:
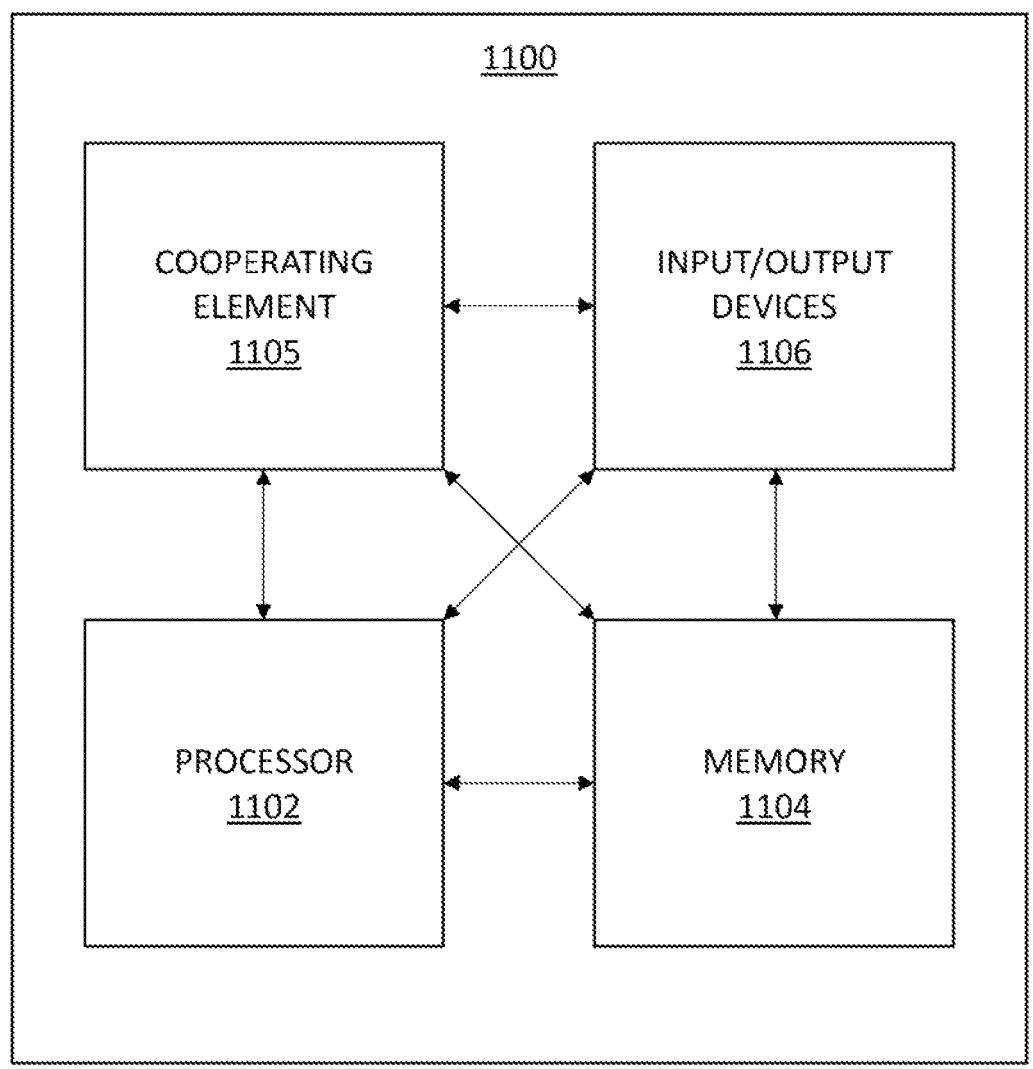
FIG. 11 depicts an example embodiment of a computer suitable for use in performing various functions presented herein.

FIG. 11 depicts an example embodiment of a computer suitable for use in performing various functions presented herein.

The computer 1100 includes a processor 1102 (e.g., a central processing unit (CPU), a processor, a processor having a set of processor cores, a processor core of a processor, or the like) and a memory 1104 (e.g., a random access memory, a read only memory, or the like). The processor 1102 and the memory 1104 may be communicatively connected. In at least some example embodiments, the computer 1100 may include at least one processor and at least one memory including computer program code, wherein the at least one memory and the computer program code are configured to, with the at least one processor, cause the computer to perform various functions presented herein.

The computer 1100 also may include a cooperating element 1105. The cooperating element 1105 may be a hardware device. The cooperating element 1105 may be a process that can be loaded into the memory 1104 and executed by the processor 1102 to implement various functions presented herein (in which case, for example, the cooperating element 1105 (including associated data structures) can be stored on a non-transitory computer-readable storage medium, such as a storage device or other suitable type of storage element (e.g., a magnetic drive, an optical drive, or the like)).

The computer 1100 also may include one or more input/output devices 1106. The input/output devices 1106 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1100 may represent a general architecture and functionality suitable for implementing functional elements described herein, portions of functional elements described herein, or the like, as well as various combinations thereof. For example, computer 1100 may provide a general architecture and functionality that is suitable for implementing one or more elements presented herein.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including instructions which, when executed by the at least one processor, cause the apparatus at least to perform:
   receiving, by a device associated with a destination application, a packet associated with a remote direct memory access connection between a source application and the destination application, wherein the packet is an initial remote direct memory access data packet sent on the remote direct memory access connection after establishment of the remote direct memory access connection using an out-of-band communication channel;
   determining, based on a tag associated with the packet, a set of application-level attributes associated with the source application;
   determining, based on the packet, a set of application-level attributes associated with the destination application;
   identifying, based on the set of application-level attributes associated with the source application and the set of application-level attributes associated with the destination application, a policy; and
   performing, based on the policy, a policy enforcement action.

2. The apparatus of claim 1, wherein, for determining the set of application-level attributes associated with the destination application, the instructions, when executed by the at least one processor, to cause the apparatus at least to perform:
   determining, from the packet, a global identifier of the destination application;
   determining, from a base transport header of the packet, a queue pair of the destination application; and
   retrieving, from an identity table based on a combination of global identifier of the destination application and the queue pair of the destination application, the set of application-level attributes associated with the destination application.

3. The apparatus of claim 1, wherein, for determining the set of application-level attributes associated with the source application, the instructions, when executed by the at least one processor, to cause the apparatus at least to perform:
   extracting, from the tag associated with the packet, an encrypted set of application-level attributes of the source application and an encrypted secret key;

decrypting, based on a private key of the device associated with the destination application, the encrypted secret key to recover a secret key;

decrypting, based on the secret key, the encrypted set of application-level attributes of the source application to recover a signed set of application-level attributes of the source application; and verifying, based on a public key of a device associated with the source application, authenticity of the signed set of application-level attributes of the source application.

4. The apparatus of claim 1, wherein, for performing the policy enforcement action, the instructions, when executed by the at least one processor, cause the apparatus at least to perform:

controlling, based on the policy, communication of subsequent packets on the remote direct memory access connection between the source application and the destination application.

5. The apparatus of claim 1, wherein, for performing the policy enforcement action, the instructions, when executed by the at least one processor, cause the apparatus at least to perform:

generating, based on the policy, a copy of the packet; and forwarding the copy of the packet toward a monitoring system for logging the remote direct memory access connection for auditing.

6. The apparatus of claim 1, wherein the device associated with the destination application includes a network interface card or a switch.

7. A method, comprising:

receiving, by a device associated with a destination application, a packet associated with a remote direct memory access connection between a source application and the destination application, wherein the packet is an initial remote direct memory access data packet sent on the remote direct memory access connection after establishment of the remote direct memory access connection using an out-of-band communication channel;

determining, based on a tag associated with the packet, a set of application-level attributes associated with the source application;

determining, based on the packet, a set of application-level attributes associated with the destination application;

identifying, based on the set of application-level attributes associated with the source application and the set of application-level attributes associated with the destination application, a policy; and performing, based on the policy, a policy enforcement action.

8. An apparatus, comprising:

at least one processor; and at least one memory including instructions which, when executed by the at least one processor, cause the apparatus at least to perform:

receiving, by a device associated with a destination application, a packet associated with a remote direct memory access connection between a source application and the destination application, wherein the packet is a remote direct memory access connection message associated with establishment of the remote direct memory access connection, wherein the remote direct memory access connection message is a connection request message;

determining, based on a tag associated with the packet, a set of application-level attributes associated with the source application;

determining, based on the packet, a set of application-level attributes associated with the destination application, wherein determining the set of application-level attributes associated with the destination application includes:

obtaining, from a destination port field of the connection request message, a destination port, wherein the destination port was previously allocated by the destination application to bind a service for supporting discovery of the service;

determining, based on the destination port, a process identifier of the destination application; and retrieving, from an identity table based on the process identifier of the destination application, the set of application-level attributes of the destination application;

identifying, based on the set of application-level attributes associated with the source application and the set of application-level attributes associated with the destination application, a policy; and performing, based on the policy, a policy enforcement action.

9. The apparatus of claim 8, wherein, for determining the set of application-level attributes associated with the source application, the instructions, when executed by the at least one processor, cause the apparatus at least to perform:

extracting, from the tag associated with the packet, an encrypted set of application-level attributes of the source application and an encrypted secret key;

decrypting, based on a private key of the device associated with the destination application, the encrypted secret key to recover a secret key;

decrypting, based on the secret key, the encrypted set of application-level attributes of the source application to recover a signed set of application-level attributes of the source application; and verifying, based on a public key of a device associated with the source application, authenticity of the signed set of application-level attributes of the source application.

10. The apparatus of claim 8, wherein, for performing the policy enforcement action, the instructions, when executed by the at least one processor, cause the apparatus at least to perform:

controlling, based on the policy, establishment of the remote direct memory access connection between the source application and the destination application.

11. The apparatus of claim 8, wherein, for performing the policy enforcement action, the instructions, when executed by the at least one processor, cause the apparatus at least to perform:

generating, based on the policy, a copy of the packet; and forwarding the copy of the packet toward a monitoring system for logging the remote direct memory access connection for auditing.

12. The apparatus of claim 8, wherein the device associated with the destination application includes a network interface card or a switch.

13. The apparatus of claim 8, wherein the direct memory access connection message is a Remote Direct Memory Access—Connection Manager (RDMA-CM) ConnectRequest message.

14. An apparatus, comprising:

at least one processor; and at least one memory including instructions which, when executed by the at least one processor, cause the apparatus at least to perform:
   receiving, by a device associated with a destination application, a packet associated with a remote direct memory access connection between a source application and the destination application, wherein the packet is a remote direct memory access connection message associated with establishment of the remote direct memory access connection, wherein the remote direct memory access connection message is a connection reply message;
   determining, based on a tag associated with the packet, a set of application-level attributes associated with the source application;
   determining, based on the packet, a set of application-level attributes associated with the destination application, wherein determining the set of application-level attributes associated with the destination application includes:
      maintaining a mapping of a local communication identifier of an outgoing connection message to a set of application-level attributes;
      obtaining, from a remote communication identifier field of the connection reply message, a remote communication identifier; and
      using, based on a matching of the remote communication identifier to the local communication identifier, the set of application-level attributes as the set of application-level attributes of the destination application;
   identifying, based on the set of application-level attributes associated with the source application and the set of application-level attributes associated with the destination application, a policy; and
   performing, based on the policy, a policy enforcement action.

15. The apparatus of claim 14, wherein, for determining the set of application-level attributes associated with the source application, the instructions, when executed by the at least one processor, cause the apparatus at least to perform:
   extracting, from the packet, an encrypted set of application-level attributes of the source application and an encrypted secret key;
   decrypting, based on a private key of the device associated with the destination application, the encrypted secret key to recover a secret key;
   decrypting, based on the secret key, the encrypted set of application-level attributes of the source application to recover a signed set of application-level attributes of the source application; and
   verifying, based on a public key of a device associated with the source application, authenticity of the signed set of application-level attributes of the source application.

16. The apparatus of claim 14, wherein, for performing the policy enforcement action, the instructions, when executed by the at least one processor, cause the apparatus at least to perform:
   controlling, based on the policy, establishment of the remote direct memory access connection between the source application and the destination application.

17. The apparatus of claim 14, wherein, for performing the policy enforcement action, the instructions, when executed by the at least one processor, cause the apparatus at least to perform:
   generating, based on the policy, a copy of the packet; and
   forwarding the copy of the packet toward a monitoring system for logging the remote direct memory access connection for auditing.

18. The apparatus of claim 14, wherein the device associated with the destination application includes a network interface card or a switch.

19. The apparatus of claim 14, wherein the direct memory access connection message is a Remote Direct Memory Access—Connection Manager (RDMA-CM) ConnectReply message.

20. An apparatus, comprising:
   at least one processor; and
   at least one memory including instructions which, when executed by the at least one processor, cause the apparatus at least to perform:
      receiving, by a device associated with a destination application, a packet associated with a remote direct memory access connection between a source application and the destination application;
      extracting, from a tag associated with the packet, an encrypted set of application-level attributes of the source application and an encrypted secret key;
      decrypting, based on a private key of the device associated with the destination application, the encrypted secret key to recover a secret key;
      decrypting, based on the secret key, the encrypted set of application-level attributes of the source application to recover a signed set of application-level attributes of the source application;
      verifying, based on a public key of a device associated with the source application, authenticity of the signed set of application-level attributes of the source application;
      determining, based on the packet, a set of application-level attributes associated with the destination application;
      identifying, based on the set of application-level attributes associated with the source application and the set of application-level attributes associated with the destination application, a policy; and
      performing, based on the policy, a policy enforcement action.

* * * * *